US011060404B2

(12) United States Patent
Zampieri

(10) Patent No.: US 11,060,404 B2
(45) Date of Patent: Jul. 13, 2021

(54) VOLUMETRIC EXPANDER, PROCESS OF STARTING THE VOLUMETRIC EXPANDER, CLOSED-CYCLE PLANT, AND PROCESS FOR CONVERTING THERMAL ENERGY INTO ELECTRIC ENERGY USING SAID PLANT

(71) Applicant: STAR ENGINE S.R.L., Negrar (IT)

(72) Inventor: Gino Zampieri, Verona (IT)

(73) Assignee: Star Engine S.R.L., Verona (IT)

( * ) Notice: Subject to any disclaimer, the term of this patent is extended or adjusted under 35 U.S.C. 154(b) by 82 days.

(21) Appl. No.: 16/321,588

(22) PCT Filed: Jul. 27, 2017

(86) PCT No.: PCT/IB2017/054578
§ 371 (c)(1),
(2) Date: Jan. 29, 2019

(87) PCT Pub. No.: WO2018/020459
PCT Pub. Date: Feb. 1, 2018

(65) Prior Publication Data
US 2020/0308967 A1 Oct. 1, 2020

(30) Foreign Application Priority Data
Jul. 29, 2016 (IT) .................. 102016000080081

(51) Int. Cl.
*F01B 23/10* (2006.01)
*F01B 1/06* (2006.01)
(Continued)

(52) U.S. Cl.
CPC .............. *F01B 23/10* (2013.01); *F01B 1/062* (2013.01); *F01B 17/04* (2013.01); *F01L 1/02* (2013.01); *F01L 7/024* (2013.01); *H02K 7/1815* (2013.01)

(58) Field of Classification Search
CPC ..... F01L 5/04; F01L 15/08; F01L 7/021–045; F01B 1/062–0637; F01B 13/06–068
See application file for complete search history.

(56) References Cited

U.S. PATENT DOCUMENTS 1,378,092 A * 5/1921 Carmody ................ F01L 7/021
1,425,381 A * 8/1922 Gueret .................... F01L 7/023
(Continued)

FOREIGN PATENT DOCUMENTS

FR 3031135 7/2016
WO WO 2014/141072 9/2014

OTHER PUBLICATIONS

PCT Search Report and Written Opinion for PCT/IB2017/054578 dated Sep. 29, 2017 (11 pages).

*Primary Examiner* — Laert Dounis
(74) *Attorney, Agent, or Firm* — Mueting Raasch Group

(57) ABSTRACT

A volumetric expander (4) comprising a casing (50) having a general inlet and outlet (51, 52), a piston (6) operating inside the casing and adapted to define an expansion chamber (7) with variable volume, a main shaft (11) connected to the piston (6), and a valve (6) for selectively opening and closing an inlet and an outlet (8, 9) of the expansion chamber (7) allowing: a condition of introduction of the working fluid in the expansion chamber (7), a condition of expansion of the working fluid in the expansion chamber (7), and a condition of discharge of the working fluid from said expansion chamber (7). The expander comprises a transmission member (53) connected—on one side—to the valve (10) and—on the other side—to the main shaft (11). The casing (50) defines a discharge chamber in direct communication with the general outlet (52) and configured for being put in direct fluid communication with the outlet (9) of the expansion chamber (7) during the condition of discharging the working fluid from the expansion chamber (7) itself. The (Continued)

transmission member (53) is disposed in the casing (50) inside the working fluid discharge chamber. The casing (50) comprises an auxiliary inlet (59) which is only directly in communication with the discharge chamber of the casing (50) and through this latter, with the general outlet (52); the auxiliary inlet (59) is configured for enabling the working fluid to directly enter the casing (50).

24 Claims, 15 Drawing Sheets

(51) Int. Cl.
    *F01B 17/04*     (2006.01)
    *F01L 1/02*     (2006.01)
    *H02K 7/18*     (2006.01)
    *F01L 7/02*     (2006.01)

(56) References Cited

U.S. PATENT DOCUMENTS

| | | | |
|---|---|---|---|
| 2,056,684 A * | 10/1936 | McLaren | F01L 7/024 |
| 2,713,329 A | 7/1955 | Lothrop | |
| 3,970,055 A | 7/1976 | Long | |
| 4,156,343 A | 5/1979 | Stewart | |
| 9,316,130 B1 | 4/2016 | Harmon | |
| 2002/0139342 A1 | 10/2002 | Trentham | |
| 2012/0267898 A1 | 10/2012 | Mazza | |
| 2013/0086891 A1 | 4/2013 | Ko | |
| 2016/0032786 A1 | 2/2016 | Zampieri | |
| 2017/0022811 A1 * | 1/2017 | Shimazu | F01B 1/062 |

* cited by examiner

VOLUMETRIC EXPANDER, PROCESS OF STARTING THE VOLUMETRIC EXPANDER, CLOSED-CYCLE PLANT, AND PROCESS FOR CONVERTING THERMAL ENERGY INTO ELECTRIC ENERGY USING SAID PLANT

This application is a U.S. National Stage Application of International Application No. PCT/IB2017/054578 filed Jul. 27, 2017, which was published in English on Feb. 1, 2018, as International Publication No. WO 2018/020459 A1. International Application No. PCT/IB2017/054578 claims priority to Italian Application No. 102016000080081 filed Jul. 29, 2016.

FIELD OF THE INVENTION

The present invention relates to a volumetric expander and a closed-cycle plant, such as a Rankine cycle, utilizing said expander for the generation of electric and/or mechanical energy by heat recovery and conversion; the present invention also relates to a process of starting the volumetric expander and a process for converting thermal energy into electric energy by means of said plant.

The present invention can be used in biogas/biomass plants for waste heat recovery from the cogeneration process, in geothermal plants for exploiting medium/small heat sources, in industrial heat waste recovery systems (conversion of heat waste from industrial processes), in households for the production of electricity and heat for sanitary use. A further use of the expander and of the relative plant may concern both domestic and industrial systems, in which the heat source is supplied by solar energy capture systems. The plant may also be used in the automotive field, for example to recover heat from the engine.

PRIOR ART

Rankine cycle systems are known that use a volumetric expander for thermal energy recovery and the subsequent production of electric energy.

An embodiment of such systems involves the use of one or more turbines as expansion chamber. However, this solution has some limitations and drawbacks, well known to the man skilled in the art, which are:

high cost of the turbine and related control members;
need for frequent maintenance resulting in various costs;
maximum yield that is only achieved at a very precise flow of the expanding fluid and with a defined rotation speed; in particular, this is perhaps the biggest limitation of turbine systems since if the rotational speed undergoes even a slight change from the optimal value, the yield of the turbine is drastically reduced.

It should also be noted that the heat sources usually available have a medium/low temperature. Converting into electric energy the heat provided by these sources is, through the use of turbines, excessively expensive in relation to the energy produced: turbines are not suitable for the exploitation of medium-low temperature heat sources which also generally have a widely varying caloric supply, which makes it all the more inappropriate to use turbines for converting thermal energy (as described above, turbines provide maximum yield at a very precise flow of the expanding fluid).

Due to their poor ability to exploit medium/low temperature sources, the latter are used to a limited extent only for professional use while they are not used in households. To date, in fact, most of the medium/low temperature sources are dispersed to the environment and therefore wasted.

The most common heat sources, and to which reference is made herein, are available both as a derivative of human activity and naturally occurring, such as the heat contained in industrial waste products or the heat contained in biomass, if this is burnt.

In order to overcome the drawbacks described above, it is known to use alternative or rotary volumetric expanders, able to operate with relatively small fluid flow rates without excessive reduction of power and yield. Volumetric expanders, by operating at lower thermal powers, work at numbers of revolutions (cycles) considerably lower than the turbine rotation speeds, which cancels the risk of damage to the moving parts in the event of passage of fluid (drops due to an incorrect vaporization of the working fluid) into the expansion chamber. Volumetric expanders also have a lower structural complexity than that of turbines, with a consequent reduction of costs. In addition to reduced complexity, volumetric expanders are more compact than turbines, which facilitates the implementation, assembly and installation thereof.

Examples of volumetric expanders used for the conversion of thermal energy into electric energy—by making use of heat sources at low temperature—are described in patent applications US2012/0267898A1 and WO2014141072. While known reciprocating volumetric expanders are improving compared to turbines in conditions of heat sources at medium/low temperature, the Applicant believes that these known volumetric expanders can be further improved in several aspects.

Known volumetric expanders consist of a support housing of the piston(s) and relative crank mechanisms, a part of a crankshaft and, optionally, one or more control valves of the working fluid flow. Outside the housing are the transmission members that connect the valves to the crankshaft, as well as a part of the crankshaft which is typically connected to an electric generator. It should be noted that known expanders generally also comprise devices for the protection and lubrication of the transmission members and connection members of the crankshaft to the electric generator. The large number of expander components—internal and external to the casing—makes the assembly and disassembly steps of the expander quite complex, a condition that adversely affects, in terms of times and costs, the installation and uninstallation steps of the expander as well as any maintenance or repair work thereof. It is also noted that the structural complexity of traditional expanders determines an inefficient lubrication and difficult setup and starting thereof.

In addition, known volumetric expanders—in particular expanders adapted to operate according to a Rankine cycle—are in general used in a discontinuous manner: the plants on which such expanders operate undergo continuous stops and starts. During an idle condition of the expander, the working fluid present therein condensates (particularly in environments with a low external temperature), thus forming condensed liquids. The condensed working fluid prevents the starting of the expander, thus making it impossible to restart the entire plant, unless said condensed liquids are first eliminated. In order to overcome this drawback, extraordinary maintenance procedures were provided in the past that forced the staff to the extemporaneous heating of the expander by means of electrical resistors placed outside the latter or by means of rudimentary systems, such as heating the expander body with a flame. The use of resistors or other extemporaneous systems, however, requires extremely long operating times and a high energy consumption that negatively affects the overall efficiency of the plant.

Alternatively, the staff was required to perform the purge of any liquid undesirably present inside the expander. Also this maintenance procedure—in addition to requiring specialized personnel—requires very long operating times that heavily weigh on the plant downtime.

OBJECT OF THE INVENTION

The object of the present invention therefore is to substantially solve the drawbacks and/or limitations of the above prior art.

A first object of the present invention is to provide a volumetric expander and a relative plant that are high efficiency, in particular allowing high yields to be achieved even through the conversion of variable thermal energy at medium/low temperature. Another object of the present invention is to provide a volumetric expander and a relative plant, for example, Rankine cycle, adaptable to different working conditions in such a way as to be able to effectively exploit the heat sources available and deliver maximum power with excellent yields.

Another object of the present invention is to provide a volumetric expander and a relative plant, for example, Rankine cycle, of simple and compact construction adapted to allow easy installation and consequently that have reduced production, maintenance and assembly costs.

Another object of the invention is to provide a volumetric expander that is easily and quickly installable on a plant for the conversion of thermal energy into electric energy; in particular, an object of the present invention is to provide a volumetric expander that can be quickly disassembled and/or removed (such as in case of installation, replacement or repair) in such a way that any plant downtime can be reduced to a minimum.

Another object of the present invention is to provide a volumetric expander having a structure capable of ensuring a rapid and effective start-up thereof; in particular, an object of the present invention is to provide a volumetric expander which does not require consumption of electric energy for starting the same.

Another object of the present invention is to provide a volumetric expander and a relative plant, for example, Rankine cycle, which can be implemented without the need for complex changes to conventional systems for converting thermal energy into electric energy. A further object of the present invention is to provide a process capable of effectively exploiting the expander and the plant mentioned above; in particular, an object of the present invention is to provide a method of converting thermal energy into electric energy easily implemented and through which it is possible to obtain excellent energy conversion efficiencies.

These and other objects, which will become more apparent from the following description, are substantially achieved by a volumetric expander, a closed-cycle plant and a process for converting thermal energy into electric energy according to what set forth in one or more of the appended claims and/or the following aspects, taken alone or in any combination with each other or in combination with any one of the appended claims and/or in combination with any one of the further aspects or features described hereinafter.

SUMMARY

Aspects of the invention are described here hereinafter. In a 1st aspect thereof, a volumetric expander (4) for a closed cycle plant is provided, particularly a Rankine cycle, said volumetric expander (4) comprising:

at least one casing (50) exhibiting at least one general inlet (51) configured for enabling to introduce a working fluid inside the casing (50) and at least one general outlet (52) configured for enabling the expulsion of the working fluid from said casing (50), at least one piston (6) operating inside the casing and adapted to define a variable volume expansion chamber (7), a main shaft (11) cinematically connected to the piston (6) and configured for rotatively moving around a main axis (X), said main shaft (11) being housed at least partially inside the casing (50), at least one valve (10) configured for selectively opening and closing an inlet and outlet (8, 9) of the expansion chamber (7) enabling at least:

one condition in which the working fluid is introduced into the expansion chamber (7), one condition in which the working fluid expands in the expansion chamber (7), and a condition in which the working fluid is discharged from said expansion chamber (7), wherein the casing (50) defines inside a discharge chamber in fluid communication with the general outlet (52), the discharge chamber being further configured for being put in fluid communication with the outlet (9) of the expansion chamber (7) during the condition of discharging the working fluid from the expansion chamber (7) itself.

In a 2nd aspect according to the 1st aspect, the casing (50) defines inside a discharge chamber in direct fluid communication with the general outlet (52).

In a 3rd aspect according to any one of the preceding aspects, the discharge chamber is configured for being put in direct fluid communication with the outlet (9) of the expansion chamber (7) during the condition of discharging the working fluid from the expansion chamber (7) itself.

In a 4th aspect according to any one of the preceding aspects, the expander comprises a transmission member (53) connected—on one side—to the valve (10) and—on the other side—to the main shaft (11), said transmission member (53) being configured for synchronizing the working fluid introduction condition, expansion condition and discharge condition with the rotation of the main shaft (11), and wherein the transmission member (53) is disposed in the casing (50) inside the working fluid discharge chamber.

In a 5th aspect according to any one of the preceding aspects, the casing (50) comprises a lateral wall extending between a first and second longitudinal end portions (50a, 50b), said lateral wall extending in thickness between an outer surface and inner surface of the casing, said inner surface delimiting an inner cavity of the casing (50) defining at least part of the discharge chamber disposed inside the casing (50) itself.

In a 6th aspect according to the preceding aspect, the transmission member (53) is disposed at least partially inside the inner cavity of the casing (50) between the first and second longitudinal end portions (50a, 50b).

In a 7th aspect according to any one of the preceding aspects, the variable volume of each expansion chamber (7) is delimited by a respective shell (5) operating inside the casing (50), and by said piston (6) slidingly received in said shell, said inlet (8) and outlet (9) being positioned on said shell which delimits a seat (22), such as a cylindrical seat (22).

In an 8th aspect according to the preceding aspect, the seat (22) is defined on the lateral wall of the casing (50), the piston (6) is movable by a sliding reciprocating motion into the seat.

In a 9th aspect according to the 7th or 8th aspect, the seat (22) of shell (5) extends along all the thickness of the lateral wall of the casing (50), in particular starting from the inner surface of the casing up to a respective valve (10).

In a 10th aspect according to any one of the preceding aspects, the expander (4) comprises at least one crank mechanism (37) constrained, on one side, to the piston (6) and, on the other side, constrained to the main shaft (11), said crank mechanism (37) being configured for putting in rotation the main shaft (11) around the axis (X) following the alternative sliding motion of the piston (6), in particular into the respective expansion chamber (7).

In an 11th aspect according to any one of the preceding aspects, at least part of the main shaft (11) is housed in the discharge chamber of the casing (50).

In a 12th aspect according to the 10th or 11th aspect, the whole crank mechanism (37) is housed in the discharge chamber of the casing (50).

In a 13th aspect according to any one of aspects 8th to 10th, the main shaft (11) comprises an engagement portion (11a) spaced from the rotation axis (X) of the main shaft (11) itself, wherein the crank mechanism (37) comprises:
- a base element (38) constrained, particularly hinged, to the engagement portion (11a) of the main shaft (11), said base element (38) being rotatively movable around the axis (X) of the main shaft (11),
- a thrusting element (39) directly connected—on one side—to the base element (38) and—on the other side—to the piston (6).

In a 14th aspect according to the preceding aspect, the engagement portion (11a) of the main shaft (11) comprises a pin, the base element (38) being hinged to said pin.

In a 15th aspect according to any one of the preceding aspects, the valve (10) comprises:
- an internally hollow valve body (24) exhibiting:
  - a housing seat (25), having for example a substantially cylindrical shape developing inside the valve body,
  - at least one first and one second passages (26, 27) respectively in fluid communication, in particular direct, with the inlet (8) and outlet (9) of the expansion chamber (7),
- at least one distributing body (28) rotatively engaged inside the housing seat (25) of the valve body, and comprising:
  - at least one introduction channel (29) fluidically communicating with the general inlet (51) of the casing (50),
  - at least one emission channel (30) fluidically communicating with the discharge chamber of the casing (50) and therefore with the general outlet (52) of this latter,
  - at least one first channel (31) directly fluidically communicating with the introduction channel (29), the first channel (31) comprising at least one lateral opening (31a) configured for being put in fluid communication with the first passage (26) of the valve body (24),
  - at least one second channel (32), distinct and separated from the first channel (31), directly fluidically communicating with the emission channel (30), the second channel (32) comprising at least one respective lateral opening (32a)—angularly offset from the lateral opening (31a) of the first channel (31) with respect to a rotation axis (Z) of the distributing body configured for being put in fluid communication with the second passage (26) of the valve body (24), the distributing body (28), following the rotation inside the housing seat (25) around the axis (Z) thereof, being configured for selectively determining the introduction, expansion and discharge conditions of the volumetric expander (4).

In a 16th aspect according to the preceding aspect, the lateral openings (31a, 32a)—respectively of the first and second channels (31, 32) of the distributing body—are configured to be put in direct fluid communication with the expansion chamber (7), in particular with the seat (22) of the shell (5).

In a 17th aspect according to the 15th or 16th aspect, the transmission member (53) is at least partially disposed inside the valve body (24) and directly engaged with the distributing body (28) of the valve (10).

In an 18th aspect according to any one of aspects 15th to 17th, the transmission member (53) comprises:
- at least one first toothed wheel (54) fitted to the distributing body (28) of the valve (10),
- at least one second toothed wheel (55) fitted to the main shaft (11),
- at least one intermediate member (56)—for example a toothed wheel (56)—configured for movably connecting the first and second toothed wheels (54, 55).

In a 19th aspect according to any one of the preceding aspects, the expander comprises a plurality of pistons (6) operating inside the casing (50).

In a 20th aspect according to the preceding aspect, each piston (6) is housed in a respective shell (5) defined inside the casing (50).

In a 21st aspect according to the 19th or 20th aspect, the pistons (6) are angularly offset from each other with respect to the rotation axis (X) of the main shaft (11), in particular defining a radial expander or also referred to as star expander.

In a 22nd aspect according to any one of aspects 19th to 21st, the volumetric expander (4) comprises a number of pistons (6) equal to or greater than 3, particularly in a number equal to or comprised between 3 and 12, even more particularly between 3 and 9.

In a 23rd aspect according to any one of the preceding aspects, the expander (4) comprises a valve (10) for each expansion chamber (7) of each piston (6).

In a 24th aspect according to any one of aspects 19th to 23rd, the crank mechanism (37) comprises a thrusting element (39) for each piston (6), each thrusting element (39) is constrained to a single base element (38).

In a 25th aspect according to any one of aspects 15th to 24th, the transmission member (53)—for each piston (6)—comprises:
- at least one first toothed wheel (54) fitted to the distributing body (28) of the valve (10),
- at least one second toothed wheel (55) fitted to the main shaft (11),
- at least one intermediate member (56)—for example a toothed wheel (56)—configured for connecting the first and second toothed wheels (54, 55), said transmission member (53) being configured for:
synchronizing—for each piston (6)—at least the working fluid introduction and discharge conditions with respect to the expansion chamber (7) with the rotation of the main shaft (11),
synchronizing at least the working fluid introduction and discharge conditions of the different expansion chambers (7) so that the introduction condition or discharge condition, respectively, of an expansion chamber (7) is temporarily offset with respect to an introduction condition or discharge condition, respectively, of another expansion chamber (7).

In a 26th aspect according to any one of aspects 5th to 25th, the casing (50) comprises:
- at the first longitudinal end portion (50a), a front closure element (57),
- at the second longitudinal end portion (50b), a back closure element (58), the inner surface of the lateral wall of the casing (50), together said front and back closure elements, delimiting the inner cavity of the casing (50) itself.

In a 27th aspect according to the preceding aspect, the front element (57) is removably constrained to the rest of the casing (50) of the expander.

In a 28th aspect according to aspect 26th or 27th, the back element (58) is removably constrained to the rest of the casing (50) of the expander (4).

In a 29th aspect according to the general inlet (51) is defined on the front element (57) or on the back element (58), and wherein the general outlet (52) is defined on the front element (57) or on the back element (58).

In a 30th aspect according to any one of aspects 26th to 29th, the general inlet (51) and general outlet (52) are both defined on the front element (57) or back element (58).

In a 31st aspect according to any one of aspects 15th to 30th, wherein:
- the general inlet (51) is in fluid communication, in particular direct, only with the introduction channel (29) of the valve (optionally of each valve), the general inlet (51) does not directly communicate neither with the discharge chamber nor with the general outlet (52), and
- wherein the general outlet (52) communicates, in particular directly, with the discharge chamber which is in direct fluid communication with the emission channel (30) of the valve (10).

In a 32nd aspect according to any one of the preceding aspects, the casing (50) comprises at least one auxiliary inlet (59) which is only in fluid communication, in particular direct, with the discharge chamber and therefore, through this latter, with the general outlet (52), the auxiliary inlet (59) being configured for enabling the working fluid to directly enter the casing (50).

In a 33rd aspect according to the preceding aspect, the auxiliary inlet (59) not being in fluid communication, in particular direct, with the general inlet (51).

In a 34th aspect according to the 32nd or 33rd aspect, the auxiliary inlet (59) being configured for enabling to directly introduce and then circulating the working fluid at a gaseous state in the discharge chamber inside the casing (50).

In a 35th aspect according to any one of aspects 32nd to 34th, the auxiliary inlet (59) is defined on the front element (57) or on the back element (58) of the casing (50).

In a 36th aspect according to any one of aspects 32nd to 35th, the general inlet (51), the general outlet (52) and the auxiliary inlet (59) are defined on the front element (57).

In a 37th aspect according to any one of aspects 32nd to 36th, the general inlet (51) and auxiliary inlet (59) are disposed both on the front closure element (57) or both on the back closure element (58) of the casing (50).

In a 38th aspect according to any one of aspects 5th to 37th, the casing (50) comprises a hollow tubular body exhibiting a through opening extending between the first and second longitudinal end portions (50a, 50b) and delimited at least partially by the inner surface, at the first and second end portions (50a, 50b) the casing (50) exhibits respectively a first and second accesses.

In a 39th aspect according to the preceding aspect, the front closure element (57) is engaged at the first access and being configured for defining cooperatively with the inner surface of the casing (50) itself, a fluid-tight closure.

In a 40th aspect according to any one of the preceding aspects, the casing (50) comprises at least one first and one second through connecting conduits (60, 61) extending from the inner surface of the casing (50) up to a respective valve (10), the valve (10) being in fluid communication with the first and second through connecting conduits (60, 61), wherein the first through connecting conduit (60) is in direct fluid communication with the general inlet (51), the first connecting conduit (60) does not communicate directly with the discharge chamber and with the general outlet (52), wherein the second through connecting conduit (61) is in direct fluid communication with the discharge chamber, optionally wherein the first and the second through conduits (60, 61) are not in direct fluid communication with each other.

In a 41st aspect according to any one of aspects 26th to 40th, the front closure element (57) comprises:
- an abutment portion (62) abutting on a front wall (50c) of the casing (50), said abutment portion (62) being configured for completely covering the first access of the casing (50),
- an engagement portion (63) emerging from the abutment portion (62) inside the cavity of the casing (50) and delimited by an outer surface countershaped to the inner surface of the casing (50).

In a 42nd aspect according to the preceding aspect, the general inlet (51) defined on the front closure element (57)—comprises:
- an attachment portion (51a) defining a blind cavity crossing in thickness the abutment portion (62) and at least part of the engagement portion (63) of the front closure element (57),
- at least a distributing channel (51b) fluidically communicating with the attachment portion (51a) and emerging transversally from this latter to the outer surface of the engagement portion (63).

In a 43rd aspect according to the preceding aspect, the distributing channel (51b) fluidically communicates with the first through conduit (60) of the casing (50).

In a 44th aspect according to any one of aspects 40th to 43rd, the introduction channel (29) of the valve (10) is in fluid communication, in particular direct, with the first through connecting conduit (60) of the casing (50), the emission channel (30) of the valve (10) being in fluid communication, in particular direct, with the second through connecting conduit (61) of the casing (50).

In a 45th aspect according to any one of aspects 26th to 44th, the back closure element (58) comprises:
- an abutment portion (68) abutting on a front wall (50d) of the casing (50), said abutment portion (68) being configured for completely covering the second access of the casing (50),
- at least one seat through the abutment portion (68) and configured for allowing the passage of the main shaft (11) which is arranged partly inside and partly outside the casing (50).

In a 46th aspect thereof, a closed cycle plant (1) is provided, particularly a Rankine cycle, for converting thermal energy in electric energy, comprising:
- a closed circuit (2) inside which at least a working fluid circulates according to a predetermined circulation direction,
- at least one volumetric expander (4) according to any one of the preceding aspects, active on the closed circuit (2) and configured for receiving, at the inlet, the working fluid at a gaseous state,
- at least one electric energy generator (12) connected to the main shaft (11) of the volumetric expander (4), said generator (12) being configured for generating electric energy following the rotation of the main shaft (11).

In a 47th aspect according to the preceding aspect, the plant (1) comprises:
- at least one pump (13) engaged on the closed circuit (2) and arranged for imposing to the working fluid said predetermined circulation direction,
- at least one heat exchanger (3) active on the closed circuit (2) and placed downstream the pump (13) with the respect to the working fluid circulation direction, said first heat exchanger (3) being arranged for receiving, at the inlet, the working fluid and being configured for receiving heat from a hot source (H) and for enabling to heat the working fluid in order to determine the passage of the same from the liquid state to the gaseous one,
- the volumetric expander (4) being connected downstream the first heat exchanger (3), with respect to the working fluid circulation direction inside the closed circuit (2), and being configured for receiving, at the inlet, the working fluid at the gaseous state generated in the first exchanger (3).

In a 48th aspect according to the 46th or 47 aspect, the plant comprises at least one second heat exchanger (16) active on the closed circuit (2) and interposed between the expander (4) and the pump (13), said second heat exchanger (16) being adapted to receive through the working fluid exiting said expander (4), said second heat exchanger (16) being configured for communicating with a cold source (C) and enabling the working fluid to condensate for defining the complete passage from the gaseous state to the liquid state.

In a 49th aspect according to the preceding aspect, the plant (1) comprises at least one collecting reservoir (17) active on the closed circuit (2) and interposed between the pump (13) and the second exchanger (16), said collecting reservoir (17) being configured for containing the working fluid at the liquid state exiting said second exchanger (16), the pump (13) being connected to the collecting reservoir (17) and being adapted to deliver the working fluid at the liquid state towards the first heat exchanger (3).

In a 50th aspect according to any one of aspects 46th to 49th, wherein the plant comprises at least one third heat exchanger (18) operatively active on the circuit (2) upstream the first heat exchanger (3) and adapted to receive through said working fluid, said third heat exchanger (18) being further configured for receiving heat from a hot source (H) and for enabling to pre-heat the working fluid before this latter is introduced in the first heat exchanger.

In a 51st aspect according to the preceding aspect, the third heat exchanger (18) is configured for pre-heating the working fluid to a saturated liquid condition.

In a 52nd aspect according to any one of aspects 46th to 51st, the first heat exchanger (3) is adapted to receive the working fluid in saturated liquid condition and provide working fluid in outlet in saturated steam condition.

In a 53rd aspect according to any one of aspects 50th to 52nd, the first and third heat exchanger (3, 18) are arranged immediately in succession with respect to each other according to a circulating direction of the working fluid, said first and third heat exchanger (3, 18) being configured for receiving heat from the same hot source (H).

In a 54th aspect according to the preceding aspect, the plant (1) comprises a heating circuit (19) extending between an inlet (20) and an outlet (21) and inside of which at least one heating fluid coming from said hot source (H) is adapted to circulate, said first and third heat exchanger (3, 18) being operatively active on the heating circuit (19) and interposed between the inlet (20) and the outlet (21) of said heating circuit (19), the heating fluid, circulating from the inlet (20) in the direction of the outlet (21), consecutively traversing the first and the third heat exchanger (3, 18).

In a 55th aspect thereof, a process of converting thermal energy into electric energy is provided, comprising the following steps:
- providing a plant (1) according to any one of aspects 46th to 54th;
- circulating the working fluid inside the circuit (2);
- heating, by the first heat exchanger (3), the working fluid flowing from this latter until when such fluid is caused to evaporate and is in a saturated steam condition;
- expanding the working fluid inside the volumetric expander (4) for moving each piston (6) and consequently rotating the main shaft (11) and producing electric energy by the generator (12),
- condensing the working fluid exiting the volumetric expander (4),
- delivering the condensed working fluid to the first heat exchanger (3),
- the process comprising at least one step of emitting the working fluid exiting each expansion chamber, in the inner discharge chamber to the casing, so that said working fluid hits at least partially the transmission member (53) disposed inside the casing (50) itself of the volumetric expander (4).

In a 56th aspect according to the preceding aspect, the step of heating the working fluid, by means of the first heat exchanger (3), brings the working fluid to a temperature less than 150° C., in particular less than 90° C., even more in particular between 25° C. and 85° C., and wherein the step of delivering the fluid, by means of the pump (13), imposes a pressure jump to the working fluid of between 4 bar and 30 bar, in particular between 4 bar and 25 bar, even more in particular between 7 bar and 25 bar.

In a 57th aspect according to the 56th or 57th aspect, the step of heating the working fluid comprises a sub-step of pre-heating the working fluid by means of the third heat exchanger (18) before the latter is introduced into the first heat exchanger (3), the pre-heating step bringing the working fluid to a temperature of between 20° C. and 100° C., in particular between 20° C. and 80° C., the heating step allowing the latter to be maintained in a saturated liquid condition.

In a 58th aspect thereof, a method of starting a volumetric expander (4) according to any one of aspects 1st to 45th is provided, said process comprising at least the following steps:
- introducing a working fluid at a gaseous state in the discharge chamber of the casing (50) through the further inlet (59) in order to heat at least partially the casing (50) and valve (10),
- optionally heating, by the working fluid at the gaseous state introduced through the further inlet (59), any working fluid at the liquid state present in the casing

(50) in order to enable, for at least part of said working fluid at the liquid state, to switch from the liquid to the gaseous state.

terminating the step of introducing the working fluid at a gaseous state through the further inlet (59) and starting introducing the working fluid at a gaseous state through the general inlet (51) for determining a starting condition of the volumetric expander (4).

In a 59th aspect according to the preceding aspect, the step of introducing the working fluid at the gaseous state through the further inlet (59) heats at least part of the transmission member (53), piston (6), expansion chamber, valve (10), and crank mechanism (37).

In a 60th aspect according to the 58th or 59th aspect, the working fluid at the gaseous state introduced in the discharge chamber through the further inlet (59) exhibits a temperature less than 150° C., particularly comprised between 25° C. and 100° C.

In a 61st aspect according to any one of aspects 58th to 60th, the working fluid at the gaseous state is introduced under pressure in the discharge chamber through the further inlet (59) at a pressure comprised between 4 bar and 30 bar, particularly between 4 bar and 25 bar, even more particularly between 7 bar and 25 bar.

In a 62nd aspect according to any one of aspects 58th to 61st, the working fluid comprises at least one organic type fluid, optionally the organic fluid of the working fluid is present by a percentage comprised between 90% and 99%, particularly between 95% and 99%, even more particularly about 98%.

In a 63rd aspect according to the preceding aspect, the organic fluid comprises at least one selected in the group of the following fluids: R134A, 245FA, R1234FY, R1234FZ.

In a 64th aspect according to the 62nd or 63rd aspect, the organic fluid comprises one or more hydrocarbons, preferably halogenated hydrocarbons, even more preferably fluorinated hydrocarbons, said working fluid having:
- a fusion temperature comprised between −110° C. and −95° C. at the atmospheric pressure;
- a boiling temperature comprised between −30° C. and −20° C. at the atmospheric pressure;
- a density comprised between 1.15 g/cm$^3$ and 1.25 g/cm$^3$ at a temperature of 25° C.;
- a vapor pressure comprised between 600000 and 700000 Pa at a temperature of 25° C.

BRIEF DESCRIPTION OF THE DRAWINGS

Some embodiments and some aspects of the invention are described hereinafter with reference to the accompanying drawings, provided only for illustrative and, therefore, non-limiting purposes, in which.

DEFINITIONS AND CONVENTIONS

Figure 1:
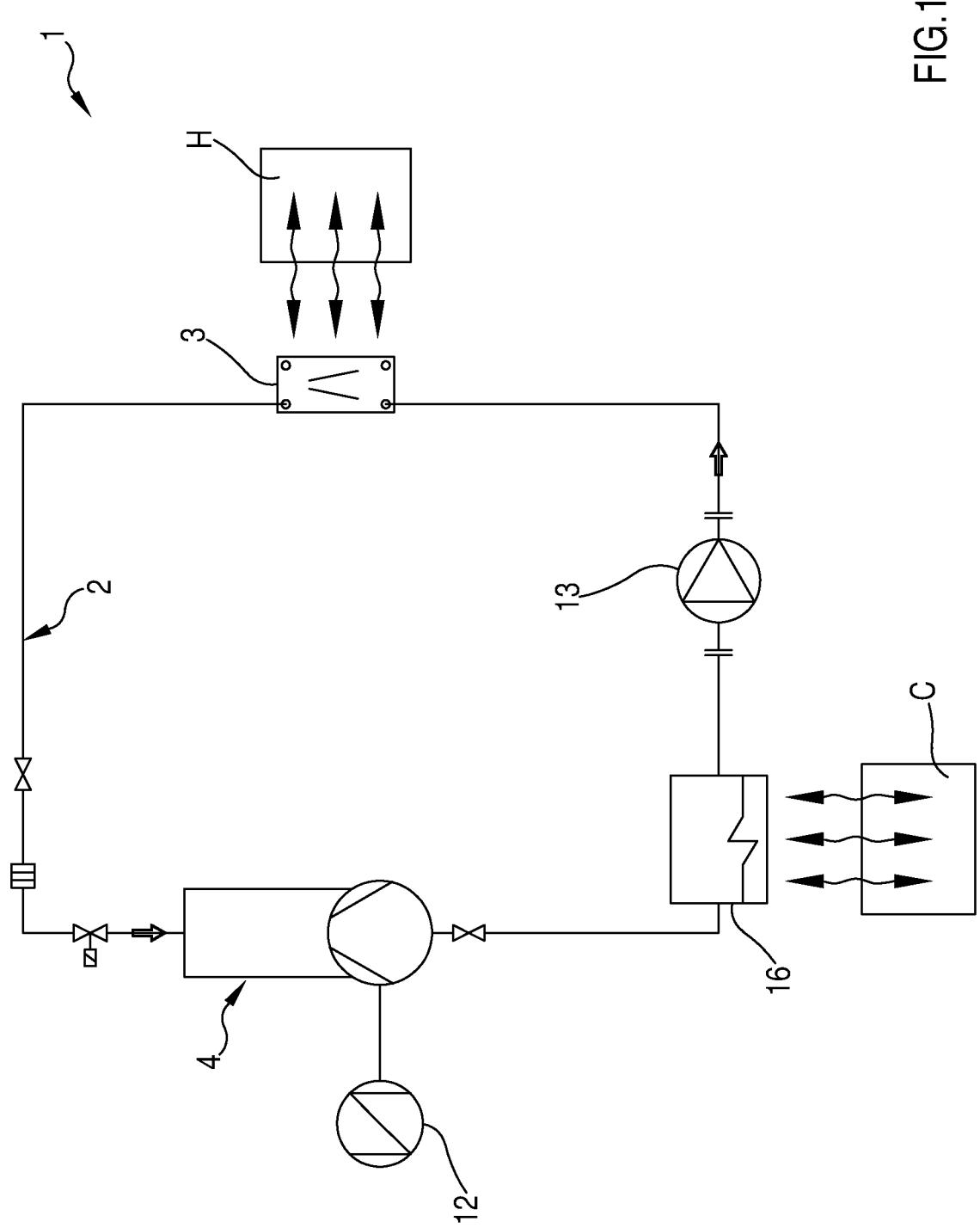
FIG. 1 shows a principle diagram of a closed circuit plant in a first embodiment thereof according to the present invention.

It should be noted that in the present detailed description, corresponding parts illustrated in the various figures are indicated by the same reference numerals.

The figures may illustrate the object of the invention by representations that are not in scale; therefore, parts and components illustrated in the figures relating to the object of the invention may relate solely to schematic representations. In the following description and in the claims, the terms upstream and downstream refer to a direction of circulation of a working fluid in a closed circuit.

The term direct fluid communication between two elements is defined as a continuous communication of the working fluid flow between said elements without the same flow being interrupted by one or more intercepting elements of the fluid. Between two elements in direct fluid communication, no fluid intercepting device is provided—interposed between the latter elements—which may somehow interrupt the fluid flow between said two elements.

The term working fluid means an organic type fluid (ORC fluid). Preferably, the working fluid comprises an amount of organic fluid of between 90% and 99%, in particular between 95% and 99%, even more in particular around 98%. The organic fluid is mixed with at least one oil configured for allowing the lubrication of moving elements inside the volumetric expander. For example, the organic fluids used may comprise at least one selected from the group of the following fluids: R134A, 245FA, R1234FY, R1234FZ.

DETAILED DESCRIPTION

General Embodiment of a Closed-Cycle Plant for the Production of Electric Energy Reference numeral 1 indicates a closed cycle plant, particularly a Rankine cycle, for converting thermal energy in electric energy. Plant 1 can for example be used in biogas/biomass plants for waste heat recovery from the cogeneration process, in geothermal plants for exploiting medium/small heat sources, in industrial heat waste recovery systems (conversion of heat waste from industrial processes), in households for the production of electricity and heat for sanitary use. A further use of plant 1 may concern both domestic and industrial systems, in which the heat source is supplied by solar energy capture systems. The plant may also be used in the automotive field, for example to recover heat from the engine.

As can be seen in FIG. 1, plant 1 comprises a closed circuit 2 within which a working fluid circulates.

Figure 2:
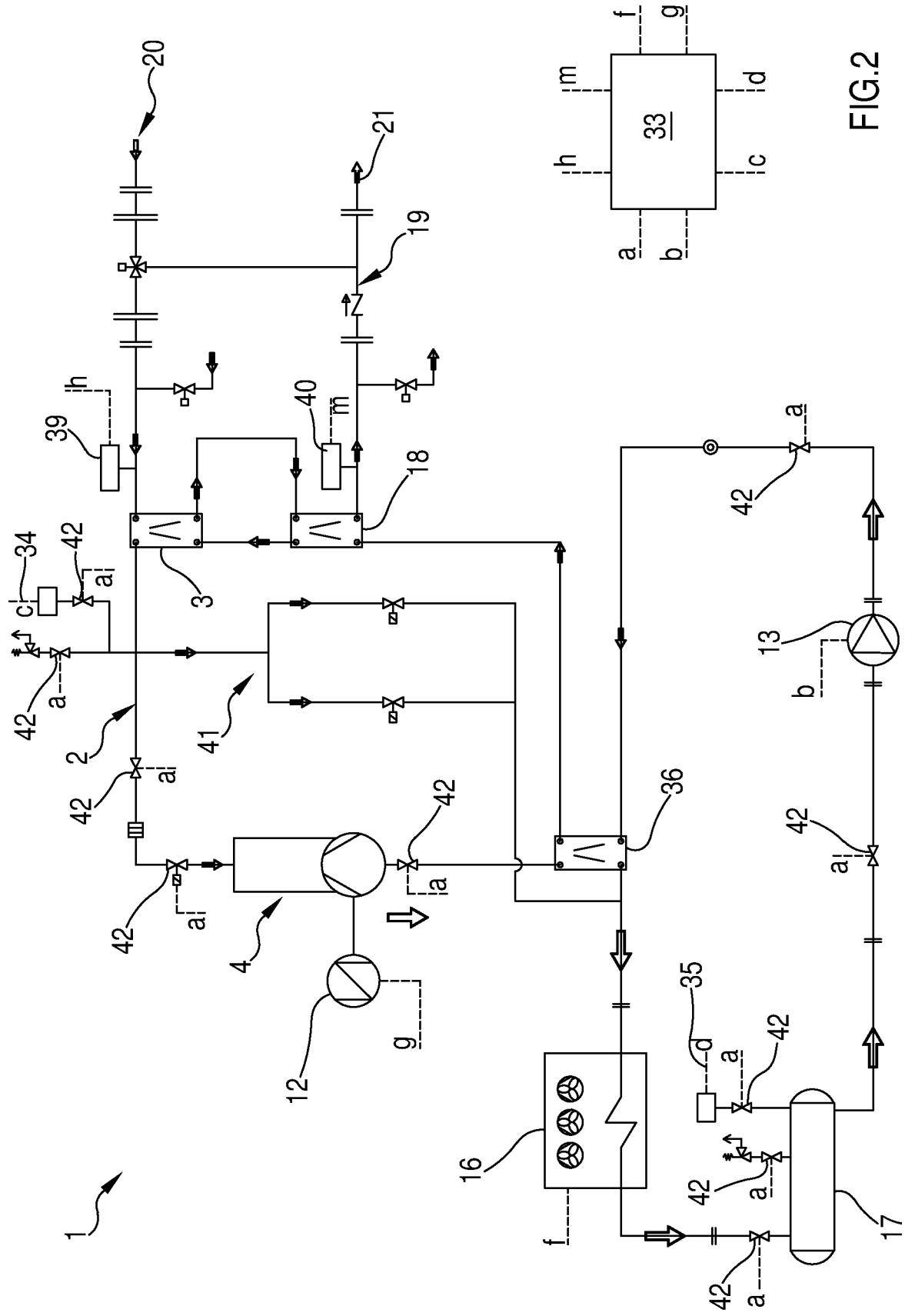
FIG. 2 shows a principle diagram of a closed circuit plant in a second embodiment thereof according to the present invention.

As can be seen for example in the schematics in FIGS. 1 and 2, plant 1 comprises at least one pump 13 engaged on circuit 2 and arranged for imposing a predetermined circulation direction to the working fluid. In a preferred but non-limiting embodiment of plant 1, pump 13 comprises a gear pump.

The working fluid entering pump 13 is in the liquid state at a predetermined pressure corresponding to a minimum pressure of the circuit. Pump 13 is configured for imposing a predetermined pressure jump to the working fluid and bringing it to a maximum pressure of circuit 2. The pressure jump imposed by pump 13 depends on the sizing of the latter and is higher than 5 bar, in particular between 5 bar and 25 bar, even more in particular between 5 bar and 20 bar. Due to the pressure jump imposed by pump 13, the working fluid circulates in circuit 2 and in particular exiting the latter it reaches a first heat exchanger or evaporator 3 active on circuit 2. In fact, the working fluid in the liquid state delivered from pump 13 is introduced inside evaporator 3 which is configured for heating said fluid up to define the change thereof from the liquid state to the gaseous state.

More in detail, evaporator 3 is arranged for receiving in passage the working fluid and also receiving heat from a hot source H adapted to allow the heating of said fluid up to the change of state: exiting evaporator 3, the working fluid is in a saturated steam condition. From a structural viewpoint, evaporator 3 may for example comprise a heat exchanger adapted to use, as a hot source H, a further working fluid coming from a different industrial plant. Alternatively, evaporator 3 may comprise a boiler adapted to allow the change of state of the working fluid by means of a hot source H obtained by combustion.

Continuing along the direction of circulation of the working fluid, it is possible to observe that the working fluid exiting the first heat exchanger 3 enters into the gaseous state into a volumetric expander 4 configured for transforming the thermal energy of the working fluid into mechanical energy.

Figure 10:
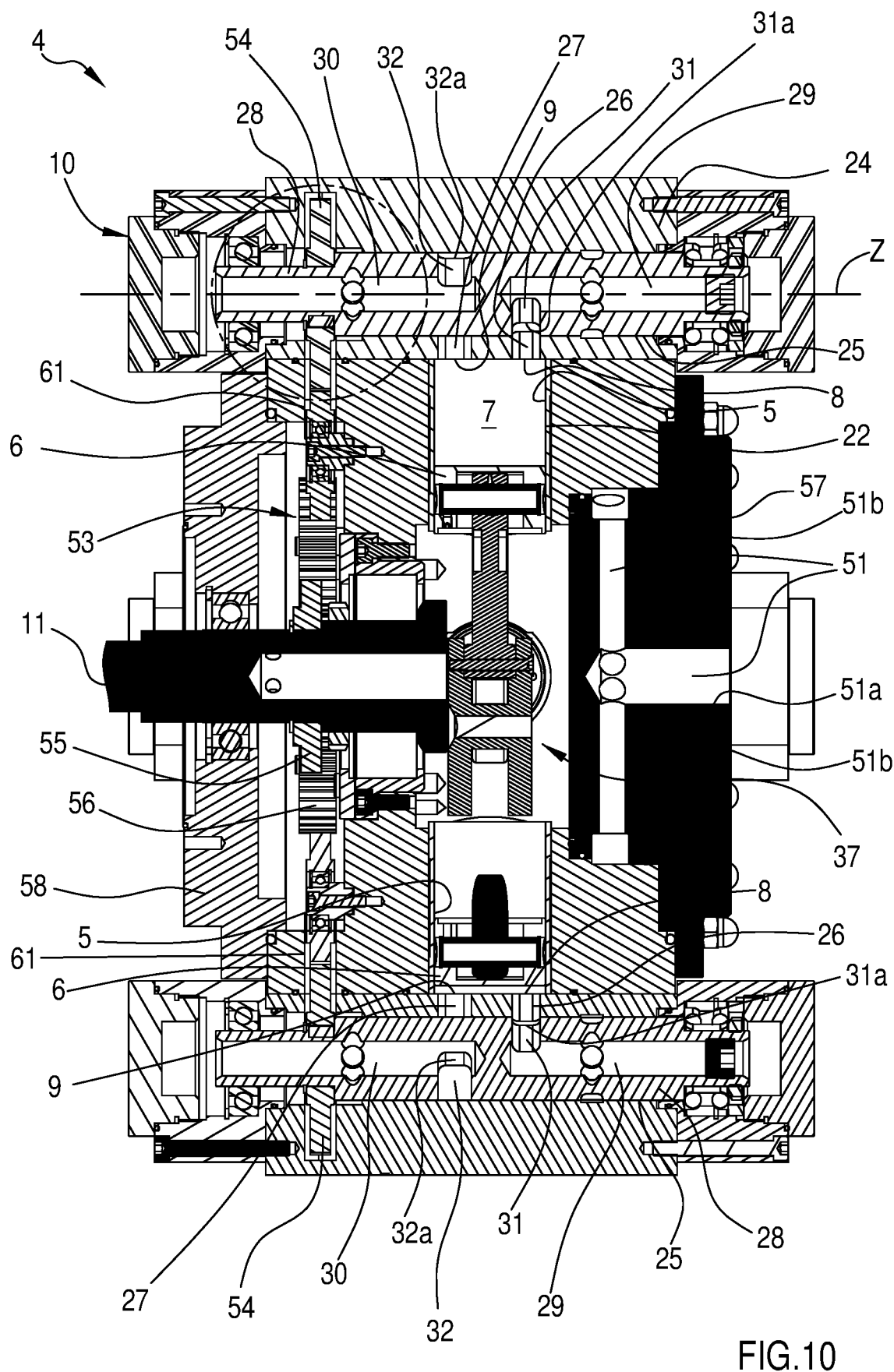
FIG. 10 shows a longitudinal sectional view of a volumetric expander according to the present invention.

The volumetric expander 4 comprises at least one piston 6 adapted to define in cooperation an expansion chamber 7 of variable volume (see for example FIG. 10). As will be better described below, the volumetric expander 4 also comprises a crank mechanism 37 connected on one end to piston 6 and on other it is associated with a main shaft 11 configured for moving with rotary motion about an axis X (see FIG. 10).

Expander 4 also has an inlet 8 and an outlet 9 respectively adapted to allow the introduction and discharge of the working fluid from the expansion chamber 7 (FIG. 10). In particular, the volumetric expander 4 comprises at least one valve 10 configured for selectively allowing the introduction and the discharge of the working fluid from the expansion chamber 7 through inlet 8 and the outlet 9 and generating the movement of the piston 6: in this way, it is possible to rotate the main shaft 11 about the axis (FIG. 10). The volumetric expander 4 will be described in detail below.

As can be seen for example in FIGS. 1 and 2, plant 1 further comprises at least one electric energy generator 12 connected to the main shaft 11 which is adapted to transform the rotation of the latter into electric energy. In particular, generator 12 may comprise at least one rotor connected to the main shaft 11 which is movable by rotation with respect to a stator. The relative movement between rotor and stator enables the development of a predetermined amount of electric energy.

Continuing along the direction of travel of the working fluid, it is possible to observe that plant 1 further comprises at least a second heat exchanger or condenser 16 active on circuit 2. Condenser 16, as shown for example in FIG. 1, is interposed between expander 4 and pump 13; the second heat exchanger 16 is arranged for receiving in passage the working fluid exiting expander 4 and allow it to pass from the gaseous state to the liquid one. More in detail, condenser 16 is configured for receiving the working fluid in passage and also communicating with a cold source C which is adapted to subtract heat to the fluid traversing said second heat exchanger 16. The working fluid exiting from condenser 16 is re-introduced into pump 13: the circuit is defined as a closed cycle, in particular a Rankine cycle.

Preferred Embodiment of a Closed-Cycle Plant for the Production of Electric Energy A preferred but non-limiting embodiment of plant 1 is shown in FIG. 2. Such a plant 1, in addition to the general embodiment, comprises an economizer 36 arranged downstream of both pump 13 and the volumetric expander 4. In greater detail, economizer 36 comprises a heat exchanger arranged for receiving the working fluid exiting the volumetric expander 4 and the working fluid exiting pump 13. Economizer 36 actually allows a pre-heating of the working fluid exiting pump 13 through the heat recovery of the working fluid exiting the volumetric expander 4.

As can again be seen in FIG. 2, plant 1 further comprises a third heat exchanger or pre-heater 18 active on circuit 2 upstream of the first heat exchanger 3 and, in particular, interposed between economizer 36 and evaporator 3. The third heat exchanger 18 is configured for receiving in passage the working fluid exiting pump 13 and pre-heated by economizer 36. The third heat exchanger 18 is further configured for receiving heat from a hot source H and allowing a further pre-heating of the working fluid before the latter is introduced into the first heat exchanger 3. In the embodiments shown in the accompanying figures, the third heat exchanger 18 consists, by way of non-limiting example, of an element separated from economizer 36 and evaporator 3. Alternatively, pre-heater 18 may be integrated with evaporator 3 to substantially form an all-in-one heat exchanger (condition not shown in the accompanying figures); in the latter condition described, plant 1 may comprise only two heat exchangers (all-in-one heat exchanger and economizer 36) or a single heat exchanger (all-in-one exchanger only), if heat recovery is not performed through economizer 36.

Preferably, plant 1 comprises at least one heating circuit 19 in fluid communication with both the first heat exchanger 3 and with the third heat exchanger 18; the circuit is arranged to allow the circulation of at least one heating fluid coming from the hot source H.

The heating circuit 19 comprises, but not limited to, a hydraulic circuit extending between an inlet 20 and an outlet 21. The hot source H may for example comprise a heated water source adapted to circulate from inlet 20 up to exit circuit 19 through outlet 21. Advantageously, the direction of circulation of the heating fluid of the hot source H (heated water in the preferred embodiment) is in countercurrent with respect to the direction of travel of the working fluid inside circuit 2.

In the embodiment in FIG. 2, evaporator 3 is a liquid (heated water) and gas (working fluid in the gaseous state) heat exchanger. The third heat exchanger 18, which is also active on the heating circuit 19, uses the heat of the same hot source H 3 used for evaporator 3 of the working fluid; since the working fluid of circuit 2 is in countercurrent with the heating fluid (hot water) of circuit 19, the latter fluid has a temperature that decreases during the passage from evaporator 3 to pre-heater 18. Advantageously, in the all-in-one condition, the integration of pre-heater 18 with evaporator 3 allows a single heat exchanger to be formed which allows considerably reducing the load losses on the end of the heating circuit 19.

The incoming heating fluid to circuit 19 may have a temperature of less than 150° C., in particular between 25° C. and 130° C. The temperature of the heating fluid is adapted to allow the evaporation of the working fluid. In output from evaporator 3, the heating fluid has a lower temperature than the temperature of the same incoming from said evaporator 3: this drop in temperature is due to the transfer of heat from the heating fluid to the working fluid. In particular, the heating fluid entering the third heat exchanger 18 may have a temperature of less than 100° C., in particular between 20° C. and 90° C.

The first and third heat exchanger 3, 18 are structurally dimensioned in such a way that the working fluid in the passage from the latter is maintained in a saturated liquid condition inside the third heat exchanger 18 while the shift of state of the working fluid from liquid to gas takes place entirely in the first heat exchanger 3.

As can be seen in FIG. 2, the plant advantageously comprises at least a first temperature sensor 39 active on the heating circuit 19 and interposed between inlet 20 and evaporator 3. The first temperature sensor 39 is configured for generating a control signal relating to the temperature of the hot fluid entering evaporator 3.

Plant 1 may further comprise a second temperature sensor 40 (FIG. 2) active in the heating circuit 19 and interposed between outlet 21 and pre-heater 18. The second temperature sensor 40 is configured for generating a control signal relating to the temperature of the hot fluid exiting pre-heater 18. As can be seen in FIG. 2, plant 1 advantageously comprises a first pressure sensor 34 active on circuit 2 and interposed between evaporator 3 and the volumetric expander 4. The first pressure sensor 34 is configured for generating a control signal relating to the pressure of the working fluid entering the volumetric expander 4, i.e. at the maximum pressure of circuit 2.

As can be seen again in FIG. 2, plant 1 further comprises a second pressure sensor 35 arranged upstream of pump 13 and configured for generating a control signal relating to the pressure of the working fluid incoming thereto, i.e. relating to the minimum pressure of the circuit.

Advantageously, plant 1 comprises a control unit 33 which is connected with the first and second temperature sensor 39, 40 (see the connecting lines "h" and "m" in FIG. 2) and with the first and second pressure sensor 34, 35 (see the connecting lines "c" and "d" in FIG. 2). The control unit 33 is configured for receiving the control signals of sensors 39 and 40 and determining the temperature of the hot source H entering and exiting evaporator 3 and pre-heater 18, respectively: in this way, the control unit 33 is able to monitor the hot source H and consequently the heat supplied to the heat exchangers. As mentioned above, the control unit 33 is also connected with the first and second pressure sensor 34 and 35; said unit 33 is configured for receiving the control signals of sensors 34 and 35 for determining the pressure of the working fluid entering and exiting the volumetric expander 4 and pump 13, respectively, i.e. the maximum and minimum pressure of circuit 2. In this way, the control unit 33 can monitor the pressure values of the working fluid in circuit 2.

Preferably, the control unit 33 is further configured for comparing the pressure in input to expander 4 with a predetermined reference value, for example referred to a minimum required pressure value, and determining an intervention or alarm condition if the measured pressure value is lower than the reference value. In fact, the monitoring performed by the control unit serves for setting/controlling the difference between the saturation temperature and the fluid working temperature, i.e. for determining whether the working fluid is in a saturated steam condition or if it is still in the phase shift (shifting from the liquid to the gaseous phase). Advantageously, plant 1 may be provided with a bypass circuit 41 in fluid communication with circuit 2 and adapted to allow the bypass of the volumetric expander 4. More in detail, the bypass circuit 41 is connected upstream and downstream of expander 4 and due to the presence of shut-off elements 42 (solenoid valves) on both circuit 2 and on the bypass circuit 41, it is possible to manage the path of the working fluid and possibly bypass the volumetric expander 4.

Advantageously, the control unit 33 is connected with the shut-off elements 42 (see the connecting lines "a" in FIG. 2): due to the monitoring of the pressure, the control unit 33 is configured for determining a possible condition of intervention (as described above, for example a condition in which the maximum pressure of the working fluid is below a predetermined limit) and controlling the bypass of expander 4 until the circulation pressure of the working fluid exceeds a predetermined level: in this way, it is possible to prevent the working fluid from being introduced into expander 4 at too low a pressure.

The control unit 33 may also be advantageously connected with pump 13 (see the connecting line "b" in FIG. 2); the control unit is configured for controlling the activation of pump 13 and in particular managing the operation thereof so as to accordingly control the value of the maximum pressure of the working fluid. The control unit 33 may also be advantageously connected with generator 12 (see the connecting line "g" in FIG. 2); the control unit 33 is configured for monitoring the operation of generator 12 and determining the amount of generated electric energy. The control unit 33 is also advantageously connected with condenser 16 (see the connecting line "f" in FIG. 2); the control unit 33 is configured for controlling the activation of condenser 16 and in particular managing the operation thereof in such a way as to control the condensing temperature of the working fluid. For example, the control unit may be connected with one or more ventilation (cooling) elements of condenser 16 and configured for managing the rotation speed of the fans; in this way, the control unit 33, via the control of the fan rotation speed, is able to adjust the cooling capacity of the ventilation elements, and thus the condensation capacity of condenser 16.

A further additional component of the plant in FIG. 2 is represented by the collecting reservoir 17; the latter is active on circuit 2 between condenser 16 and pump 13. The collecting reservoir 17 has the function of collecting and containing the working fluid in the liquid state exiting condenser 16 so that the draft of liquid of pump 13 is ensured. In particular, reservoir 17 prevents the pumping of working fluid loaded with air bubbles which could cause a failure of plant 1.

Volumetric Expander.

The object of the present invention is a volumetric expander 4 configured for transforming the thermal energy of the working fluid into mechanical energy. Expander 4 comprises at least one casing 50 exhibiting at least one general inlet 51 configured for enabling to introduce a working fluid inside casing 50 and at least one general outlet 52 configured for enabling the expulsion of the working fluid from said casing 50.

As can be seen in the accompanying figures, the following is housed inside casing 50:
- at least one piston 6 adapted to define a variable volume expansion chamber 7,
- at least part of the main shaft 11 cinematically connected to piston 6 and configured for rotatively moving around a main axis X,
- at least one valve 10 configured for selectively opening and closing an inlet and an outlet 8, 9 of the expansion chamber 7 allowing at least a condition of introduction of the working fluid in the expansion chamber 7, a condition of expansion of the working fluid in the expansion chamber 7, and a condition of discharge of the working fluid from said expansion chamber 7,
- a transmission member 53 connected—on one side—to valve 10 and—on the other side—to the main shaft 11. The transmission member 53 is configured for synchronizing the working fluid introduction condition, expansion condition and discharge conditions with the rotation of the main shaft 11.

The general inlet 51, via circuit 2, allows the introduction into casing 50 of working fluid coming from evaporator 3 while the general outlet 52, again via circuit 2, allows the discharge of the working fluid exiting casing 50 into condenser 16.

Figure 3:
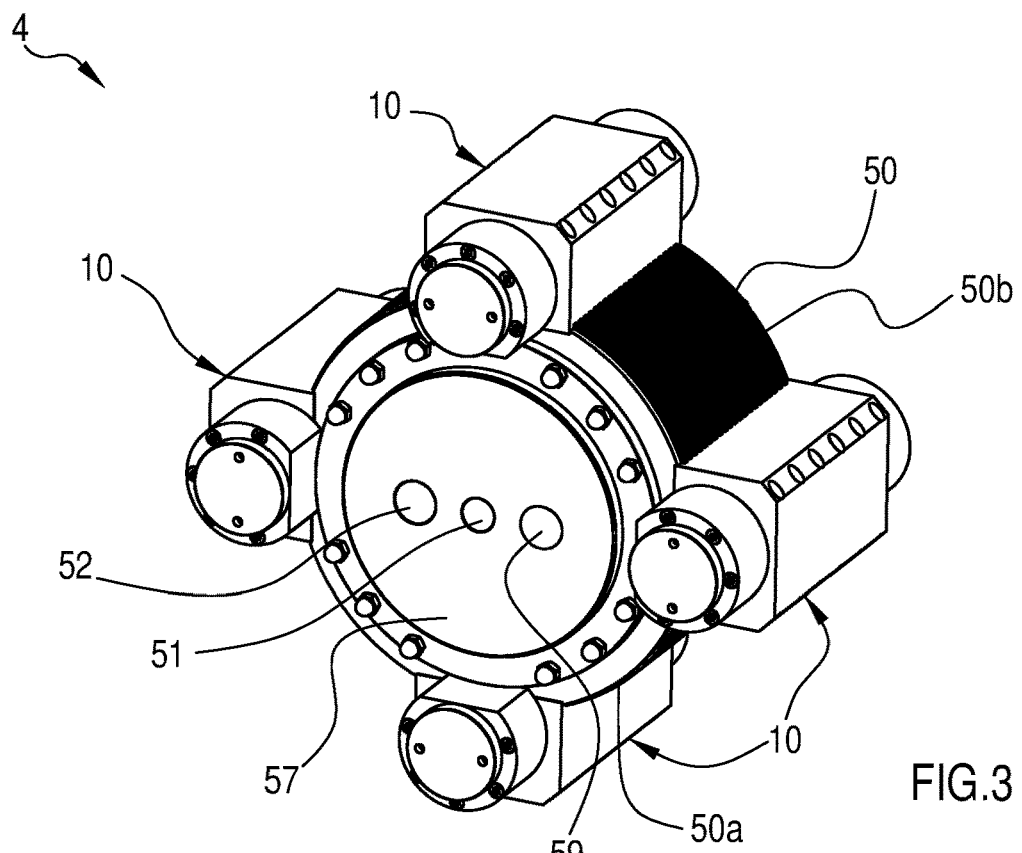
FIG. 3 shows a perspective view of a volumetric expander according to the present invention.
Figure 4:
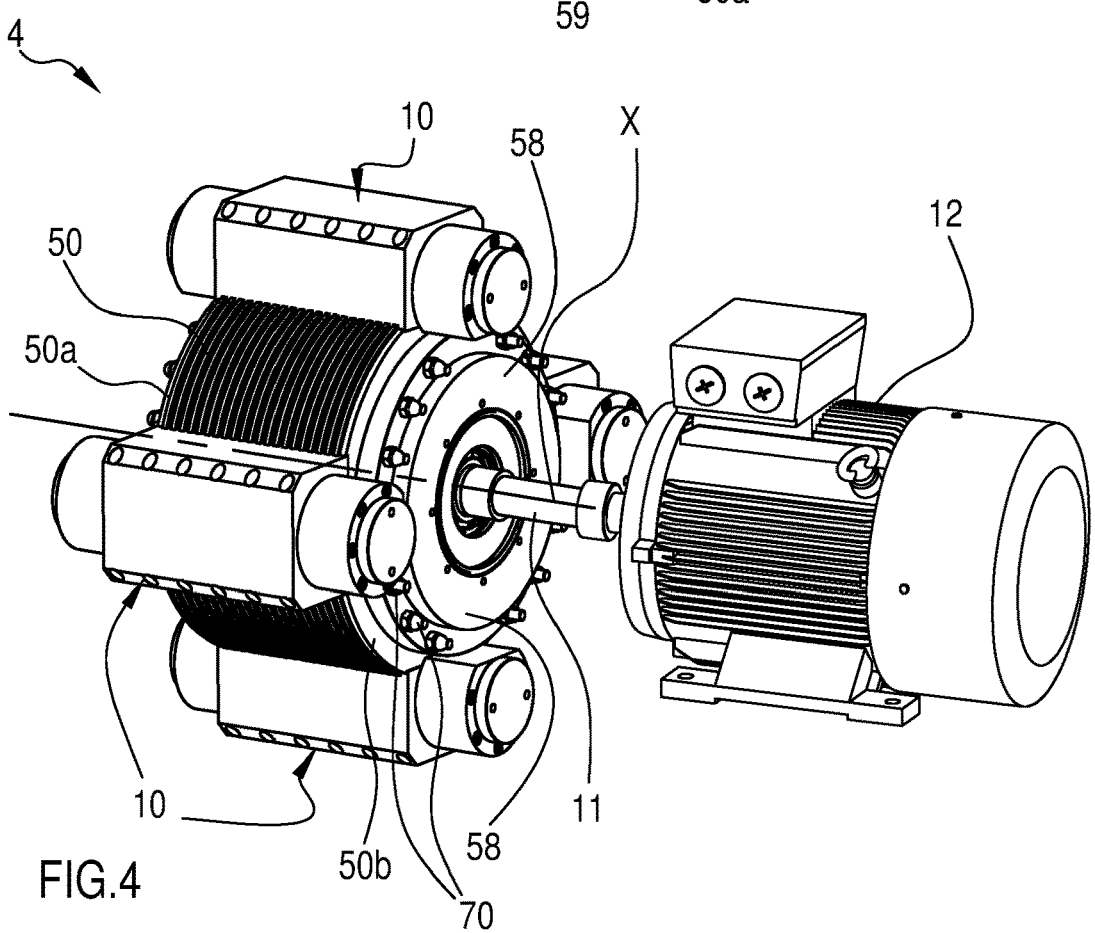
FIG. 4 shows a perspective view of a volumetric expander according to the present invention associated with an electric generator.

In greater detail and as shown for example in FIGS. 3 and 4, casing 50 comprises a lateral wall extending between a first and a second longitudinal end portion 50a, 50b; the lateral wall extends in thickness between an outer surface and an inner surface. The inner surface defines an inner cavity of casing 50 defining at least in part a discharge chamber of the working fluid within casing 50 and in direct fluid communication with outlet 52. The general outlet 52 is in direct fluid communication only with the discharge chamber of casing 50. The accompanying figures show, in a non-limiting manner, an inner surface of casing 50 with a circular section (see for example FIG. 5).

In a preferred but non-limiting embodiment of the invention, casing 50 comprises a hollow tubular body exhibiting a through opening extending between the first and second longitudinal end portions 50a, 50b and delimited at least partially by the inner surface, at the first and second end portions 50a, 50b, casing 50 exhibits respectively a first and second accesses.

As can be seen for example in FIGS. 3 and 4, at the first longitudinal end portion 50a, casing 50 comprises a front closure element 57 while at the second end portion 50b it comprises a back closure element 58; the closure elements 57 and 58 are configured for closing—in particular in a hermetically sealed manner—the first and the second access, respectively, and for cooperating with the inner surface of the casing in order to delimit the discharge chamber.

Figure 9:
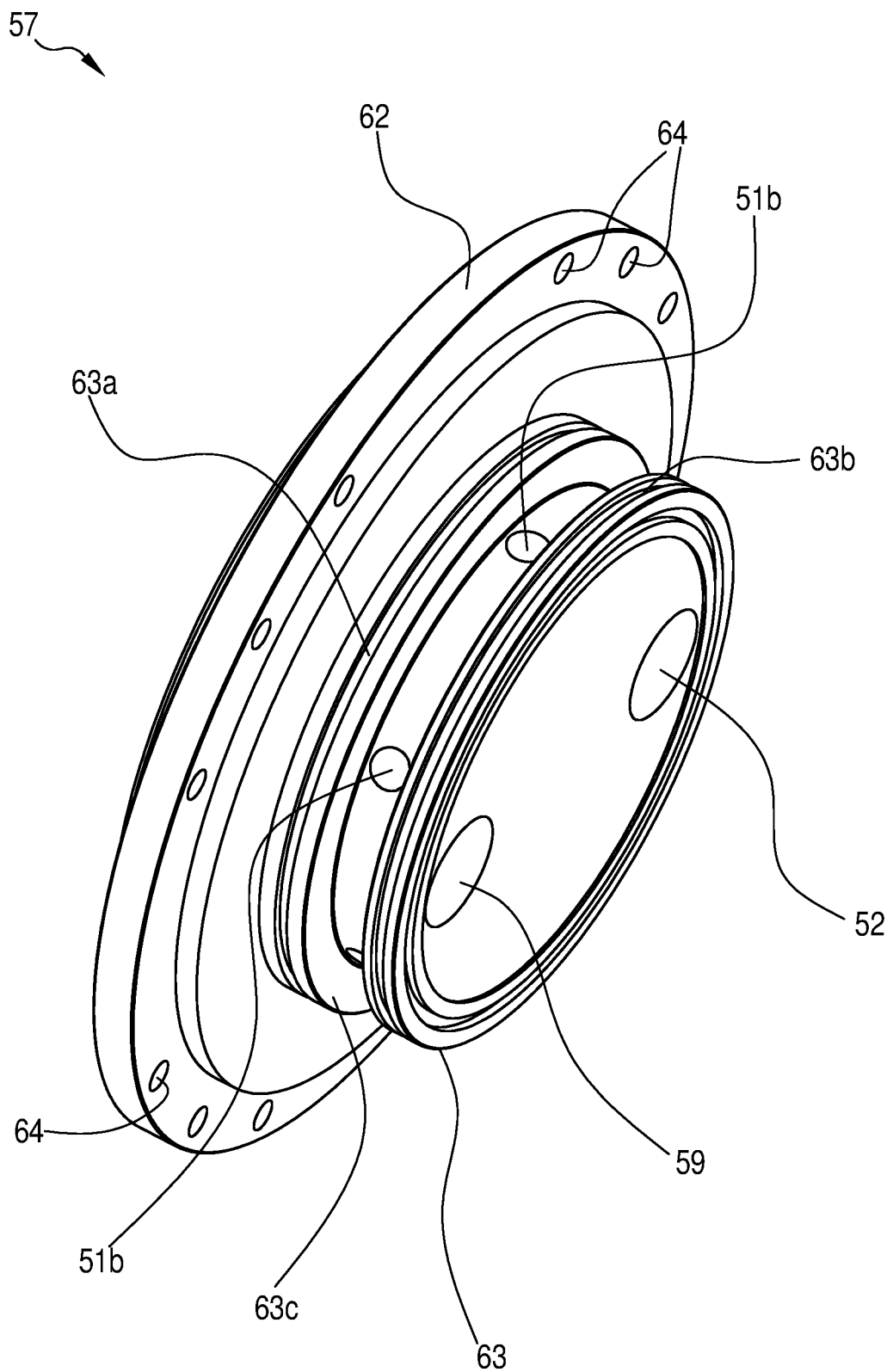
FIG. 9 shows a perspective view of a closure element of a volumetric expander according to the present invention.

In greater detail, the front closure element 57 comprises an abutment portion 62 abutting on a front wall 50c of casing 50. The abutment portion 62 is configured for entirely covering the first access of casing 50. The abutment portion 62 has, by way of non-limiting example, a circular shape and extends along a prevailing extension plane. The front element 57 further comprises an engagement portion 63 integrally joined to the abutment portion and emerging from the latter within the cavity of casing 50. The engagement portion 63 also has a circular shape and has maximum radial dimensions—measured along the development plane of the abutment portion 62—smaller than the maximum dimensions of the latter. In particular, the engagement portion 63 comprises a cylinder concentric to the circular plate of the abutment portion 62 and having a diameter smaller than the diameter of the abutment portion 62 (FIG. 9). In even greater detail, the engagement portion 63 is delimited by a cylindrical outer surface substantially countershaped to the inner surface of casing 50.

In particular, the outer surface of the engagement portion 63 is at least partly countershaped and substantially abutting on the inner surface of casing 50; the outer surface extends from the abutment portion 62 along a direction orthogonal to the development plane of the latter. As shown in FIG. 9, the outer surface of the engagement portion 63 has a first and a second radial groove 63a, 63b extending along the whole development of the diameter of portion 63 and defining a housing seat for a sealing element, such as a gasket, configured for cooperating with the inner surface of casing 50 for ensuring the fluid-tight sealing of the first access. As shown in FIG. 9, the first and the second radial groove 63a, 63b are mutually spaced apart along the orthogonal direction of portion 63; in interposition between said grooves 63a, 63b, the outer surface has a radial recess 63c; the recess defines a distribution conduit 67 in cooperation with the inner surface 50 (FIG. 8) the function of which will be better described hereafter.

The front closure element 57 is reversibly engaged to casing 50 in such a way that the same element 57 can be easily removed to allow rapid access to the elements housed inside casing 50. In particular, the abutment portion 62 of element 57 has a series of through holes 64 configured for allowing the passage and engagement of screws 66 configured for constraining to threaded holes 65 made on the front wall 50c of casing 50.

As described above, the casing further comprises a back element 58 configured for hermetically closing the second access of the casing.

The back closure element 58 comprises a respective abutment portion 68 (FIG. 6) abutting on a back wall 50d of casing 50. The abutment portion 68 is configured for entirely covering the second access of casing 50. The abutment portion 68 has, by way of non-limiting example, a circular shape and extends along a prevailing extension plane. The back element 58 is reversibly engaged to casing 50 in such a way that the same element 58 can be easily removed to allow rapid access to the elements housed inside casing 50. In particular, the abutment portion 68 of element 58 has a series of through holes 69 configured for allowing the passage and engagement of screws (FIG. 4) configured for constraining to threaded holes 71 made on the back wall 50d of casing 50.

Figure 6:
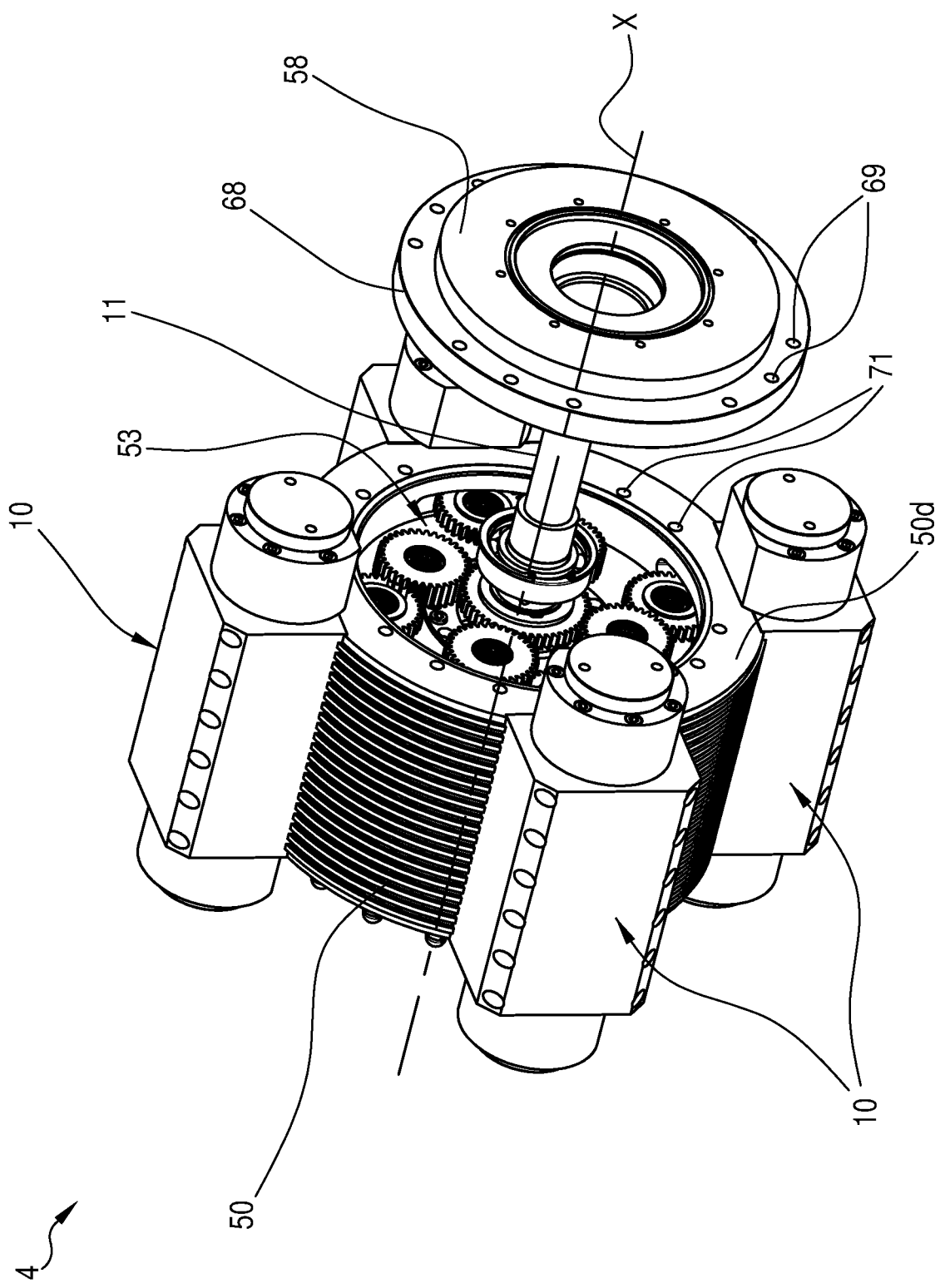
FIG. 6 shows a further exploded view of a volumetric expander according to the present invention.
Figure 7:
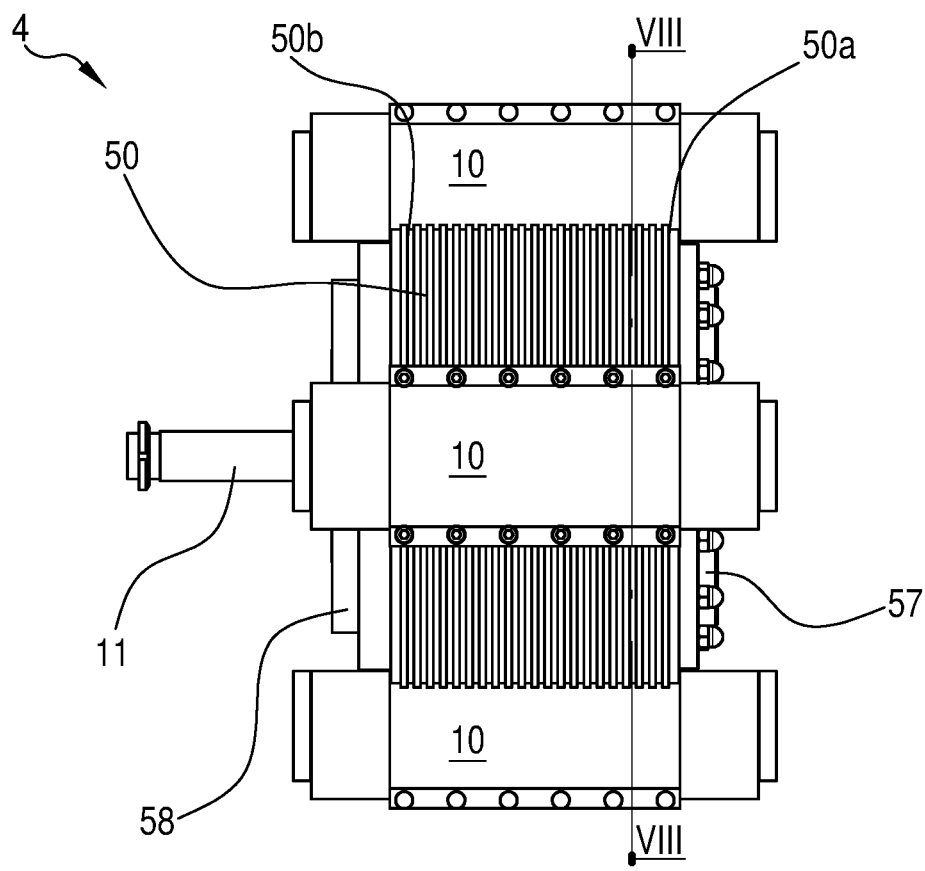
FIG. 7 shows a lateral view of a volumetric expander according to the present invention.

As seen in FIG. 6, the back element 58 comprises a through seat 72 configured for allowing the passage of the main shaft 11 which is arranged partly inside and partly outside casing 50.

Figure 5:
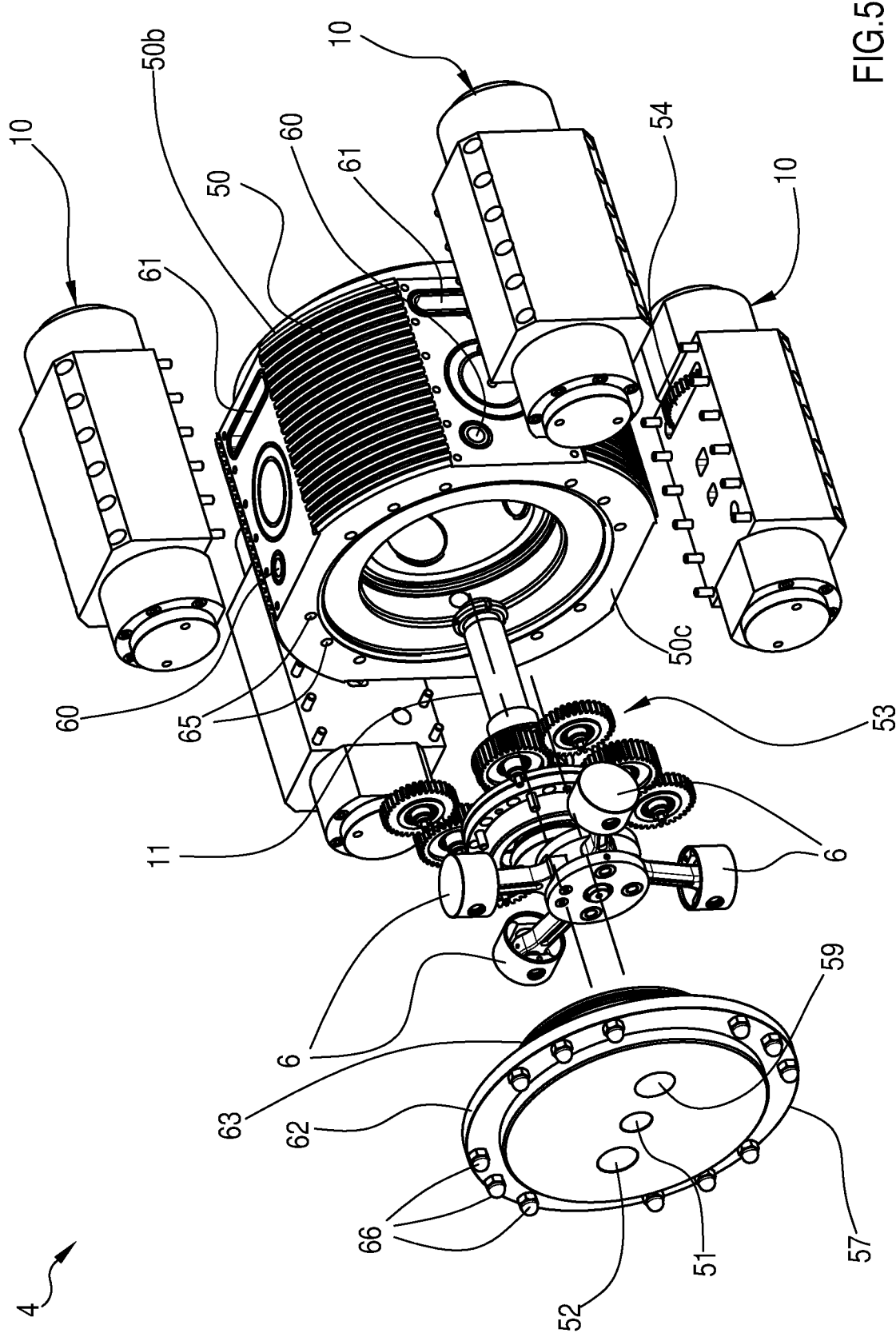
FIG. 5 shows an exploded view of a volumetric expander according to the present invention.
Figure 5A:
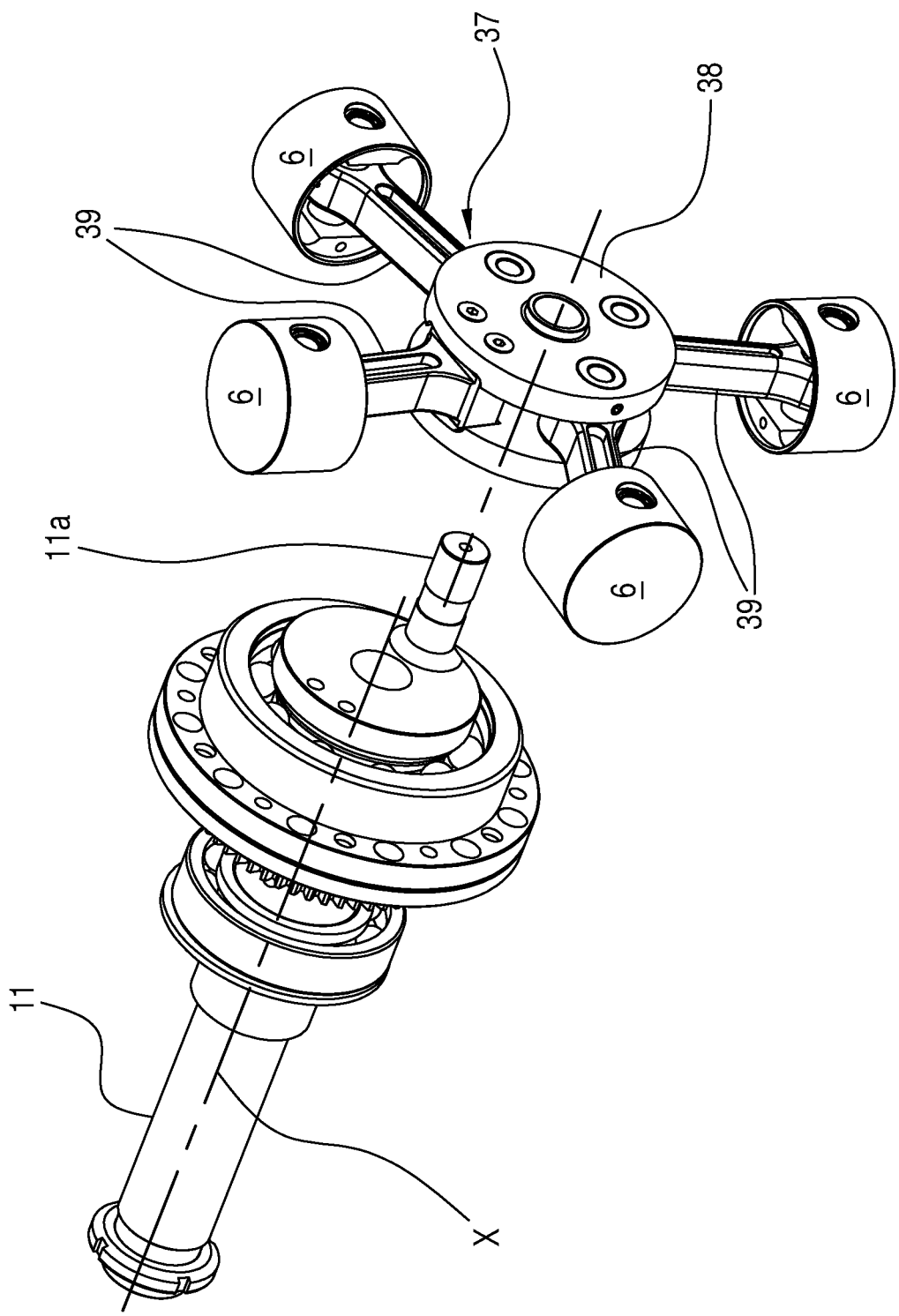
FIG. 5A shows a schematic exploded view of a part of the volumetric expander according to the present invention.
Figure 5B:
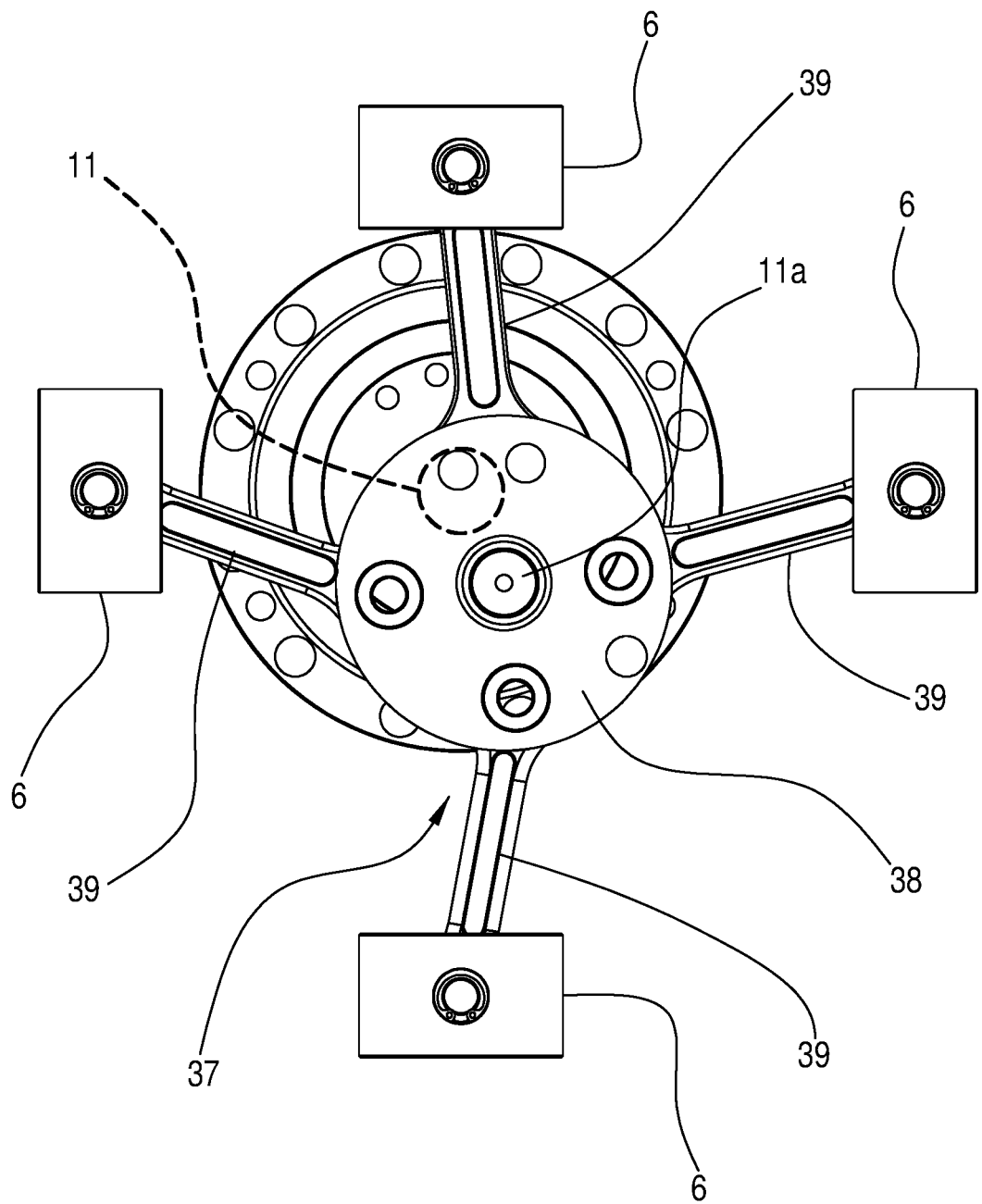
FIG. 5B shows a schematic front view of a part of the volumetric expander according to the present invention.

As shown in FIG. 5, casing 50 comprises, for each piston 6 and in particular for each expansion chamber 7, at least a first and a second through connecting conduit 60, 61 extending from the inner surface of the casing up at valve 10 associated with the respective piston 6. In particular, as will be better described below, expander 4 comprises a plurality of pistons 6 adapted to define, in cooperation with casing 50, a plurality of expansion chambers 7; for each expansion chamber 7, casing 50 comprises a first and a second through connecting conduit 60, 61 in fluid communication with valve 10 associated with the respective chamber 7.

The first through conduit 60 may comprise a circular hole in direct fluid communication with the general inlet 51: the first connecting conduit 60 does not directly communicate with the discharge chamber and with the general outlet 52. The first conduit 60 is in particular in direct fluid communication with the distribution conduit 67 (FIG. 8) defined between the inner surface of the casing and the engagement portion 63 of the front closure element.

The second through conduit 61 is separate and spaced from the first conduit 60 and comprises a recess having, in a non-limiting manner, rectangular shape. The second conduit is in direct fluid communication with the discharge chamber: the first and the second through conduits 60, 61 are not in direct fluid communication with each other. The first and the second connecting conduits are mutually separated by valve 10.

As described above, casing 50 comprises the general inlet and outlet 51, 52. The general inlet 51 may be defined on the front closure element 57 or on the back closure element 58; likewise, the general outlet 52 may be defined on the front closure element 57 or on the back closure element 58. In a preferred but non-limiting embodiment of the invention, general inlet and outlet 51, 52 are defined on the same closure element. In particular, the accompanying show a preferred configuration of the invention in which general inlet and outlet 51, 52 are both arranged on the front closure element 57.

Figure 8:
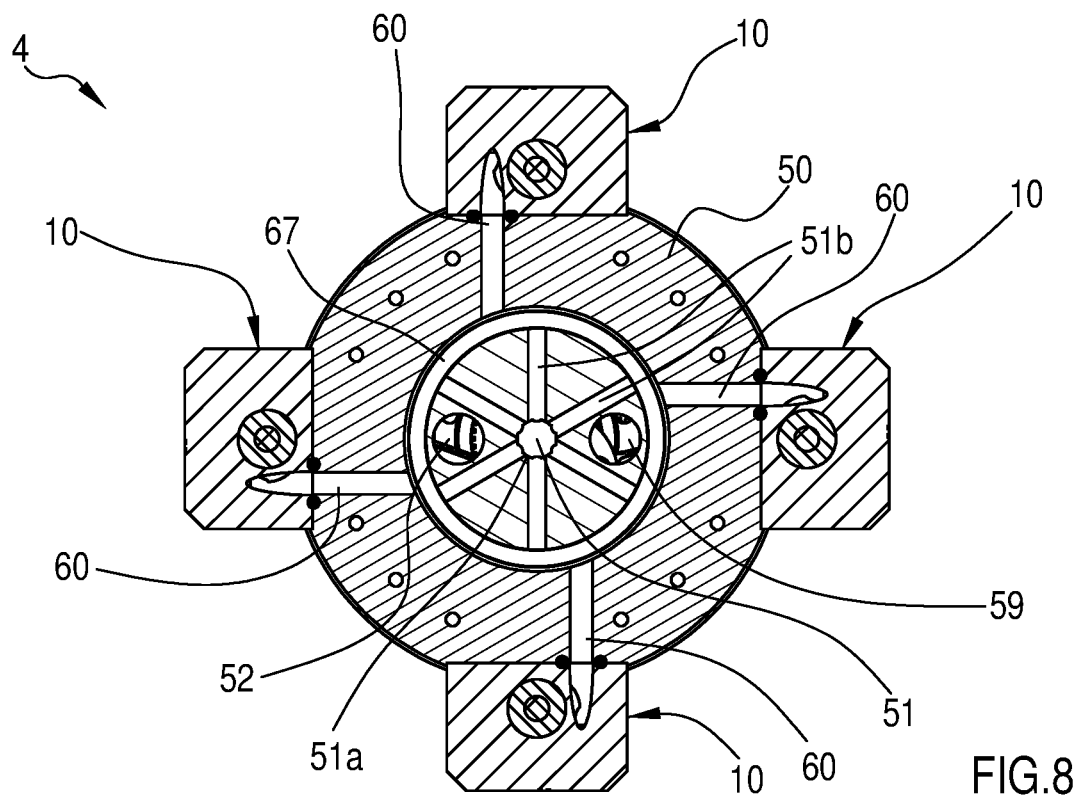
FIG. 8 shows a sectional view according to line VIII-VIII of the volumetric expander in FIG. 7.

In greater detail, the general inlet 51 comprises an attachment portion 51a (FIG. 10) defining a blind cavity crossing in thickness the abutment portion 62 and at least part of the engagement portion 63 of the front closure element 57. The general inlet 51 further comprises at least one distributing channel 51b fluidically communicating with the attachment portion 51a and emerging transversally from this latter to the outer surface of the engagement portion 63. In particular, the distributing channel 51b starts from the attachment portion 51a attack and ends within the distributing conduit 67. In this way, the working fluid entering the expander is introduced through the attachment portion 51a, reaches the distributing channel 51b, enters the distributing conduit 67, reaches the first through connecting conduit 60 which carries the fluid to the respective valve 10. The accompanying figures show in a non-limiting manner a configuration of expander 4 having four pistons and four valves; in this configuration, casing 50 comprises four distinct first conduits 60 which are in communication with the distributing conduit and configured for carrying the working fluid from the distributing conduit 67 to the respective valve 10 (FIG. 8).

The working fluid entering valve 10 is then sent to the respective expansion chamber 7 and discharged into the respective second through conduit 61. The casing comprises a number of second conduits 61 as there are valves 10 of expander 4 and thus the number of pistons 6. In the condition shown in the accompanying figures, the casing comprises four seconds conduits 61 which communicate with the respective valve 10 and directly with the discharge chamber. Each second conduit 62 is configured for allowing the working fluid—exiting the expansion chamber and thus the valve—to be sent to the discharge chamber of casing 50. The working fluid in the working chamber is in direct fluid communication with the general outlet 52.

As can be seen in the accompanying figures, casing 50 comprises at least one auxiliary inlet 59 which is only directly in communication with the discharge chamber of casing 50 and therefore, through this latter, with the general outlet 52, the auxiliary inlet 59 is configured for enabling the working fluid to directly enter casing 50. The auxiliary inlet 59 is not in direct fluid communication with the general inlet 51 but only communicates directly with the discharge chamber and the general outlet 52. The auxiliary inlet 59 may be defined on the front closure element 57 and/or on the back closure element 58. In a preferred but non-limiting embodiment of the invention, the auxiliary inlet 59 is arranged on the closure element on which the general inlet 51 is arranged, in particular general inlet 51 and auxiliary inlet 59 are both arranged on the front closure element 57. In a preferred embodiment of the invention, general inlet 51, auxiliary inlet 59 and general outlet 52 are arranged on the front closure element 57.

In greater detail, the auxiliary inlet comprises an opening through the front closure element 57, such as identical to the general outlet 52. The through opening of inlet 59 crosses the entire thickness of the front closure element 57 (passing through the abutment portion and the engagement portion) without interfering with the general inlet 51. As will be better described below, the auxiliary inlet is configured for allowing the introduction of hot working fluid in the gaseous state directly into the discharge chamber: auxiliary inlet 59, discharge chamber and overall outlet 52 essentially define a by-pass circuit that allows the passage of the working fluid inside the casing without triggering the movement of the main shaft 11; in this way, the passing working fluid can heat any condensed working fluid formed inside the casing to allow the state shift thereof from liquid state to gaseous state.

As briefly mentioned above, the expander comprises at least one piston 6 operating inside the casing and adapted to define a variable volume expansion chamber 7. In particular, expander 4 comprises a plurality of pistons 6 and respective expansion chambers 7. The accompanying figures show, in a non-limiting manner, an expander 4 comprising four pistons 6; the expander may, however, comprise a number of pistons 6 equal to or between 3 and 12, in particular equal to or between 4 and 9.

The accompanying figures show a preferred but non-limiting embodiment of the invention in which the variable volume of each expansion chamber is delimited by a respective shell 5 operating inside casing 50, and a respective piston 6, slidingly housed in shell 5: inlet 8 and outlet 9 are positioned on said shell 5 which delimits a seat 22, particularly a cylindrical seat defined on the lateral wall of casing 50 and inside which piston 6 is movable by a sliding reciprocating motion. As shown for example in FIG. 10, seat 22 of shell 5 extends along all the thickness of the lateral wall of casing 50, in particular starting from the inner surface of casing 50 up to the respective valve 10.

The accompanying figures show a volumetric expander 4 defining a radial cylinder expander or star expander in which the cylinders (expansion chambers 7 and in particular shells 5) are arranged according to radial lines around the main shaft 11. In the case shown in the accompanying figures, the radial expander 4 consists of a single "star" with four cylinders or shells 5; however, expander 4 may consist of multiple "stars", that is, multiple independent series of cylinders (condition not shown in the accompanying figures).

As mentioned above for the transmission of motion of piston 6 to the main shaft 11, expander 4 comprises, irrespective of the type of expander 4 used, a crank mechanism 37 (such as a connecting rod) connected on one end to piston 6 while on the opposite end it is constrained to the main shaft 11 which is designed to move by rotatory motion about axis X: this connection allows piston 6 to determine the rotation of the main shaft 11 about axis X, and thus to convert the thermal power of the working fluid into mechanical power.

In the case shown in the accompanying figures (radial or star expander), the crank mechanism 37 is entirely contained inside housing 50 and in particular housed into the discharge chamber. The crank mechanism 37 essentially comprises a base element 28, for example comprising a circular plate, hinged to an engagement portion 11a of the main shaft 11, which is spaced apart from the axis of rotation X of the same main shaft 11: the engagement portion 11a comprises a pin offset with respect to axis X. The base element 38 is hinged to the engagement portion 11a and movable by rotation about axis X of the main shaft 11. The base element 38 is configured for rotating concentrically around the engagement portion 11a and at the same time around axis X of the main shaft 11.

The crank mechanism 37 further comprises at least one thrusting element 39, such as a connecting rod, directly connected—on one side—to the base element 38 and—on the other side—to piston 6. The crank mechanism 37 comprises a thrusting element for each piston 6. The thrusting element 39 is connected to the piston and to the base element in a per se known manner. In radial type expanders, a connecting rod is fixed on one side to the base element 38 and the other side is hinged to piston 6. The remaining connecting rods are instead hinged both to the base element and to the respective piston.

As described above, chamber 7, in particular shell 5, has at least one inlet 8 and one outlet 9 respectively adapted to allow the introduction and discharge of the working fluid coming from evaporator 3, into the expansion chamber 7. The volumetric expander 4 is in fluid communication with circuit 2 by means of said inlet 8 and said outlet 9 which are respectively adapted to allow the introduction of the working fluid into the expansion chamber 7 and the subsequent discharge thereof.

In order to determine the movement of each piston 6, the circulation of working fluid passing from the volumetric expander, in particular from the expansion chamber 7, must be adjusted. For this reason, the volumetric expander 4 comprises a valve 10 arranged, but not limited to, outside the expansion chamber 7 (substantially defining the head of shell 5) and configured for selectively allowing the introduction and the discharge of the working fluid into/from the expansion chamber 7. In greater detail, valve 10 is structured so as to define predetermined operating conditions within the expansion chamber 7, such as:
- a condition of introduction in which it allows the passage of fluid from inlet 8 while it prevents the passage of fluid from outlet 9;
- a condition of expansion in which it prevents the passage of fluid from both inlet 8 and from outlet 9 of the expansion chamber 7;
- a condition of discharge in which it prevents the passage of fluid from inlet 8 while it allows the passage of fluid from outlet 9.

Based on the foregoing, it can be seen that the working fluid leaving the first heat exchanger 3 or evaporator is not in direct fluid communication with the working fluid exiting the same expander 4 since there is a flow interruption due to the closure of the inlet and discharge for the definition of the expansion condition.

The succession of the conditions described above defines a working cycle of the fluid within the expansion chamber 7. Through the alternation of the introduction, expansion and discharge conditions, valve 10 allows the movement of piston 6 within the shell (reciprocating sliding). From this point of view, expander 4 substantially defines a two-stroke engine that performs a complete cycle of introduction and discharge in a single revolution of the main shaft.

As described above, the expander comprises a plurality of expansion chambers and respective valve 10; valves 10, in order to ensure the rotation of the main shaft 11, must synchronize the expansion condition within the expansion chambers so that the latter do not occur simultaneously (timing of pistons 6).

Each valve 10 comprises a valve body 24 having a housing seat 25 having, without limitation, a substantially cylindrical shape. Body 24 of valve 10 further comprises at least one first and one second passages 26, 27 respectively designed to put the housing seat 25 in fluid communication with inlet 8 and outlet 9 of the expansion chamber 7.

Valve 10 further comprises at least one distributing body 28 configured for movably constraining within the housing seat 25. In fact, the distributing body 28 has, but not limited to, a shape at least partially countershaped to the housing seat 25 (substantially cylindrical shape) and is engaged by rotation within the latter to substantially define a rotary valve.

The distributing body 28 comprises an introduction channel 29 in fluid communication with the general inlet 51 of casing 50, particularly with the first conduit 60 of casing 50, and an emission channel 30 in fluid communication with the discharge chamber of casing 50, and thus with the general outlet 52 of the latter. Introduction and emission channel are not in fluid communication with each other.

Such a body 28 comprises, at a lateral wall, at least a first and a second channel 31, 32 angularly mutually staggered with respect to an axis of rotation of the distributing body 28.

The first and second channel 31, 32 are arranged on the distributing body 28 in such a way that, in the condition of engagement between the latter and body 24 (insertion into the housing seat 25), such channels 31, 32 are adapted to be put in fluid communication with the first and second passage 26 and 27. In particular and as seen in FIG. 10, the first channel 31 is in direct fluid communicating with the introduction channel 29 of the valve body 34: the first channel 31 comprises a lateral opening 31a configured for being put in fluid communication with the first passage 26 of the valve body 24.

The second channel 32, distinct and separated from the first channel 31, is in direct fluid communicating with the emission channel 30 of the valve body 24; the second channel 32 comprises at least one respective lateral opening 32a—angularly offset from the lateral opening 31a of the first channel 31 with respect to a rotation axis Z of the distributing body—configured for being put in fluid communication with the second passage 26 of the valve body 24. The distributing body 28, following the rotation inside the housing seat 25 around axis Z thereof, is configured for selectively determining the introduction, expansion and discharge conditions of the volumetric expander 4.

The lateral openings 31a, 32a—respectively of the first and second channels 31, 32 of the valve body 24—are configured to be put in direct fluid communication with the expansion chamber by means of the first and second passage 26, 27, respectively.

Figure 11:
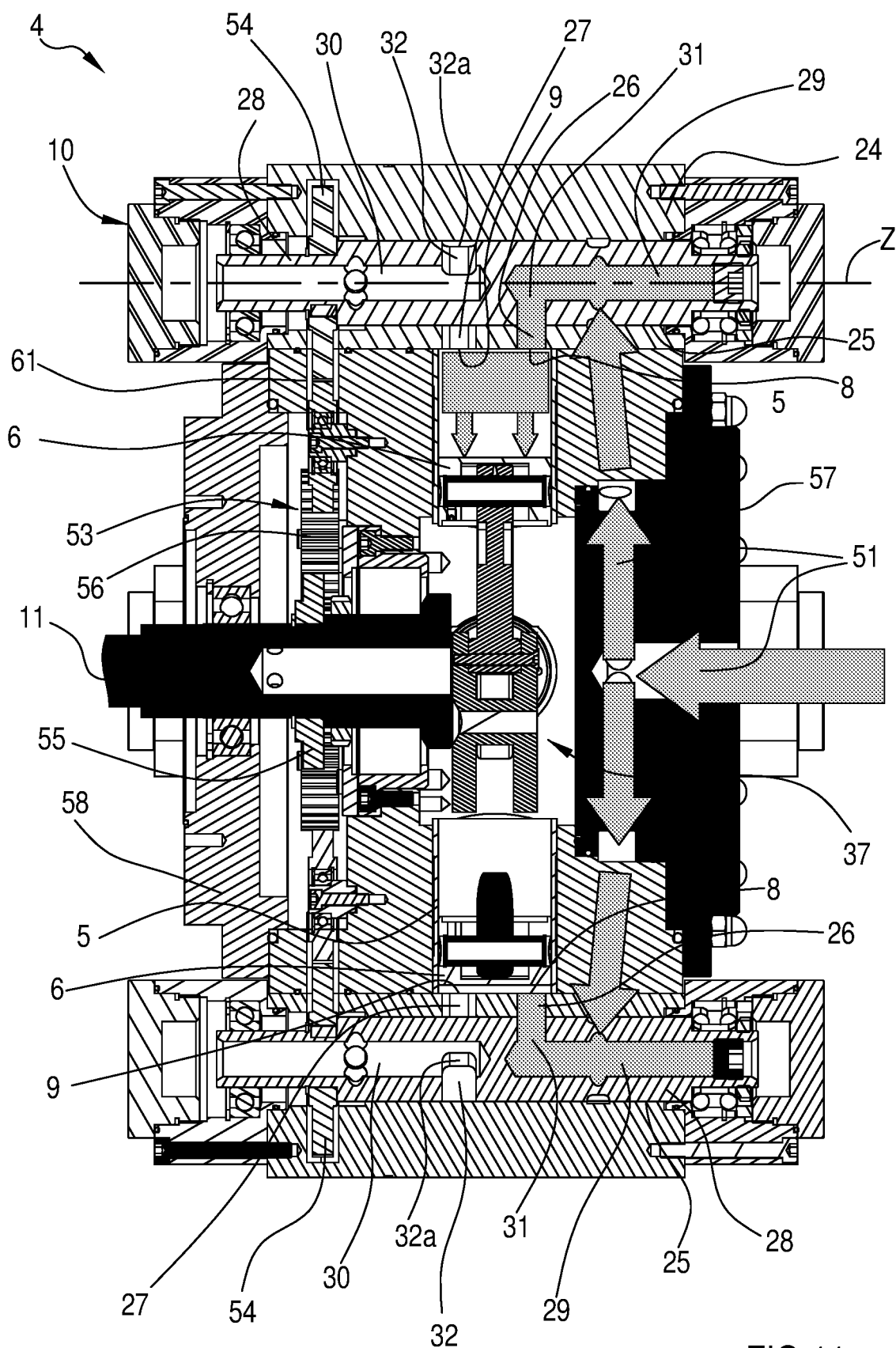
FIG. 11 shows a longitudinal sectional view of a volumetric expander according to the present invention in which a condition of introduction of fluid inside the expander is schematized.

During the condition of introduction of the working fluid inside the expansion chamber 7, there is a predetermined positioning of the first and second channel 31, 32. In particular, during this condition, opening 31a of the first channel 31 is facing inlet 8 of the expansion chamber: with a certain and predetermined position of rotation of the distributing body 28, opening 31a arranges itself in front of the first passage 26, in particular inlet 8 (FIGS. 10 and 11). In this same condition of introduction, the lateral opening 32a of the second channel 32 is facing in opposition to the second passage 27, in particular to outlet 9.

Figure 12:
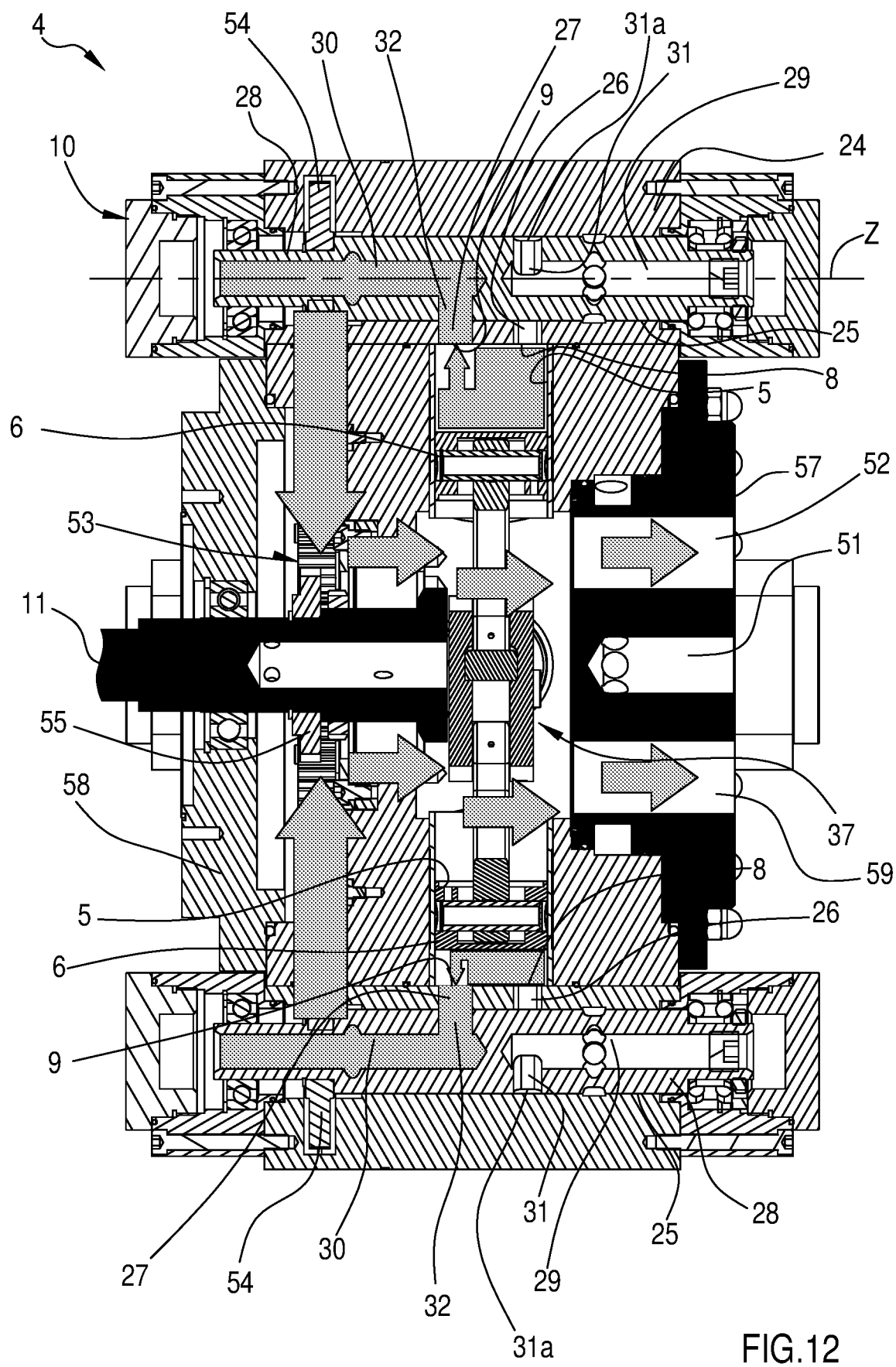
FIG. 12 shows a longitudinal sectional view of a volumetric expander according to the present invention in which a condition of emission of fluid from the expander is schematized.
Figure 12A:
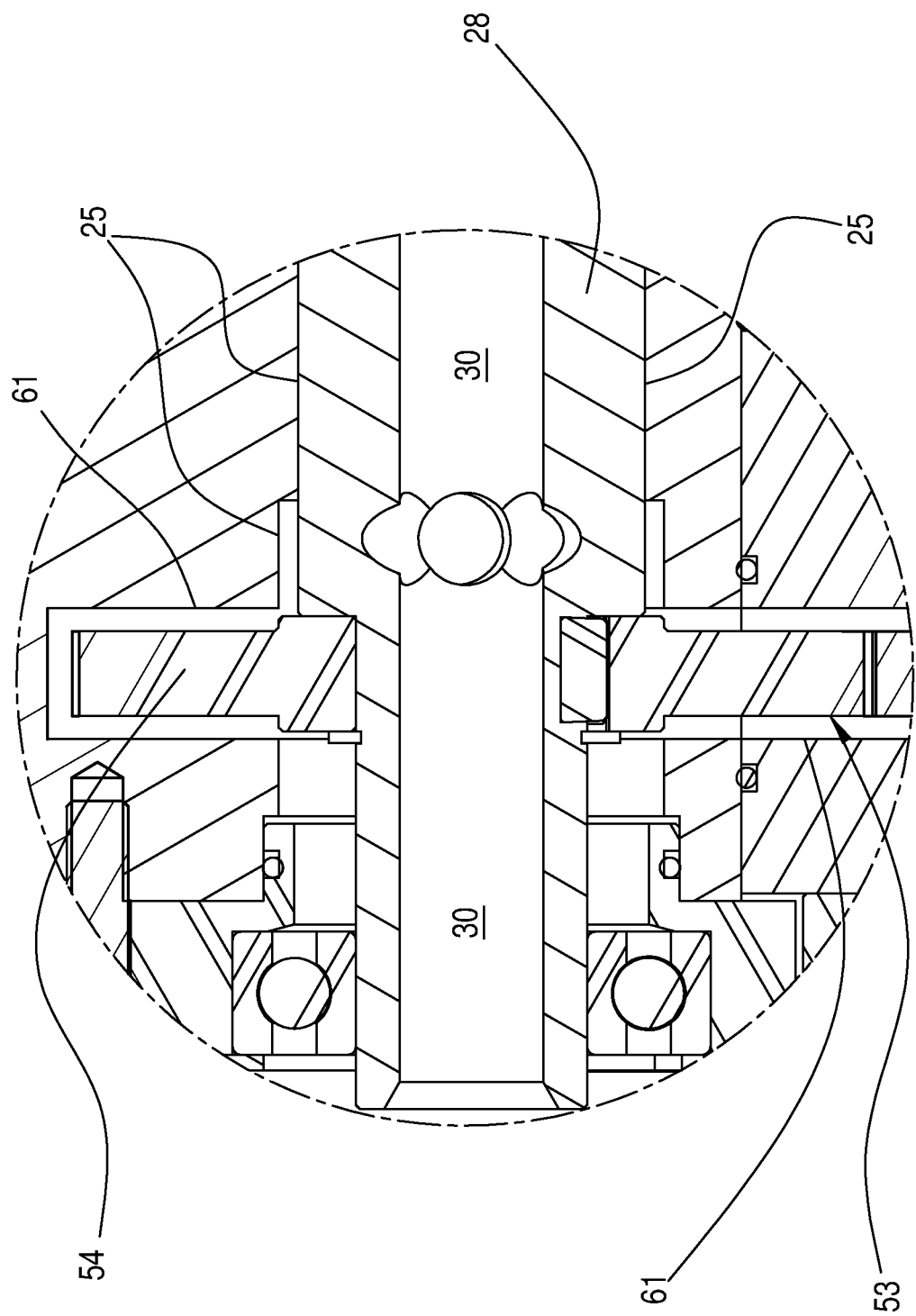
FIG. 12A shows a detailed view of a volumetric expander according to the present invention.
Figure 13:
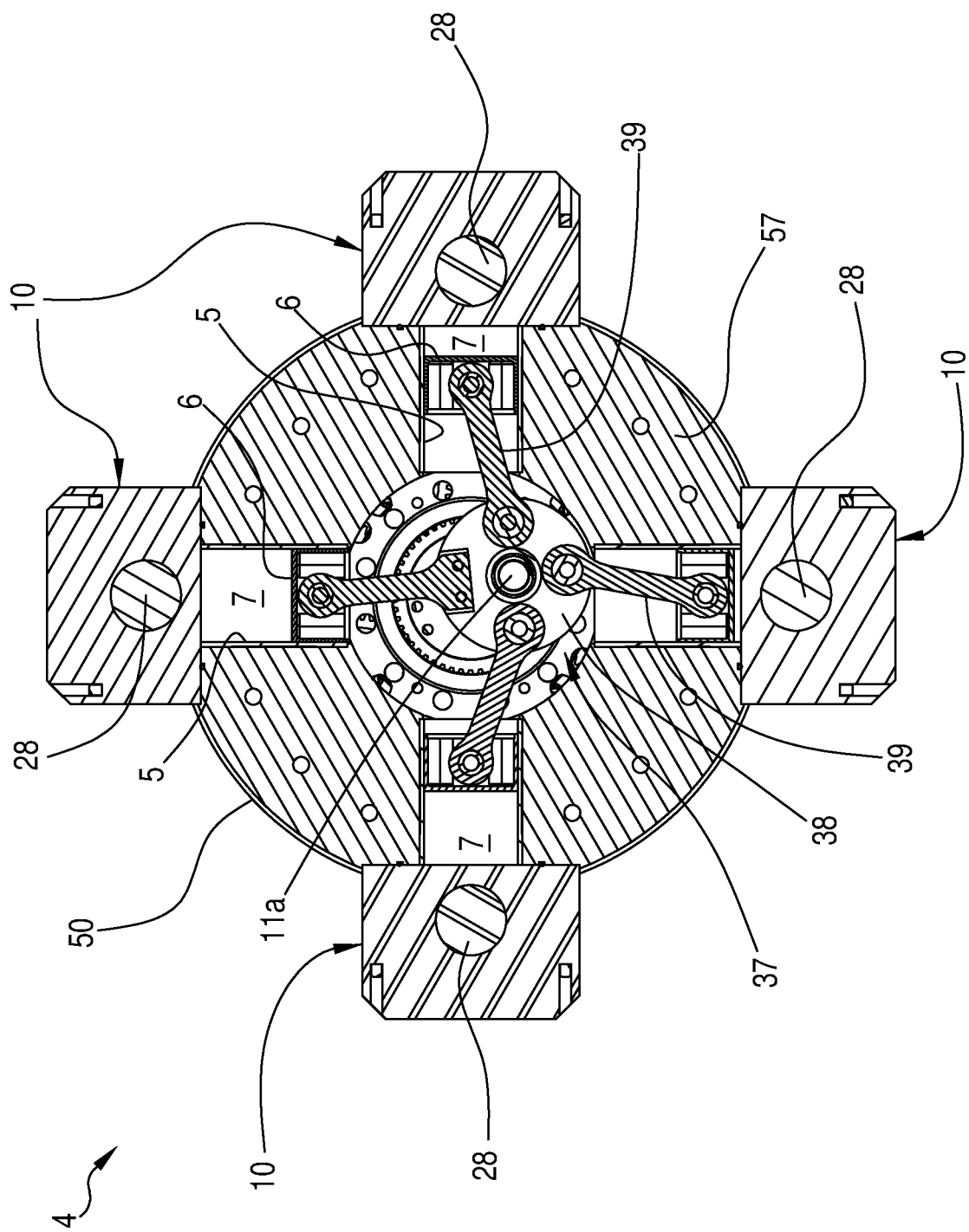
FIG. 13 shows a cross sectional view of a volumetric expander according to the present invention.
Figure 14:
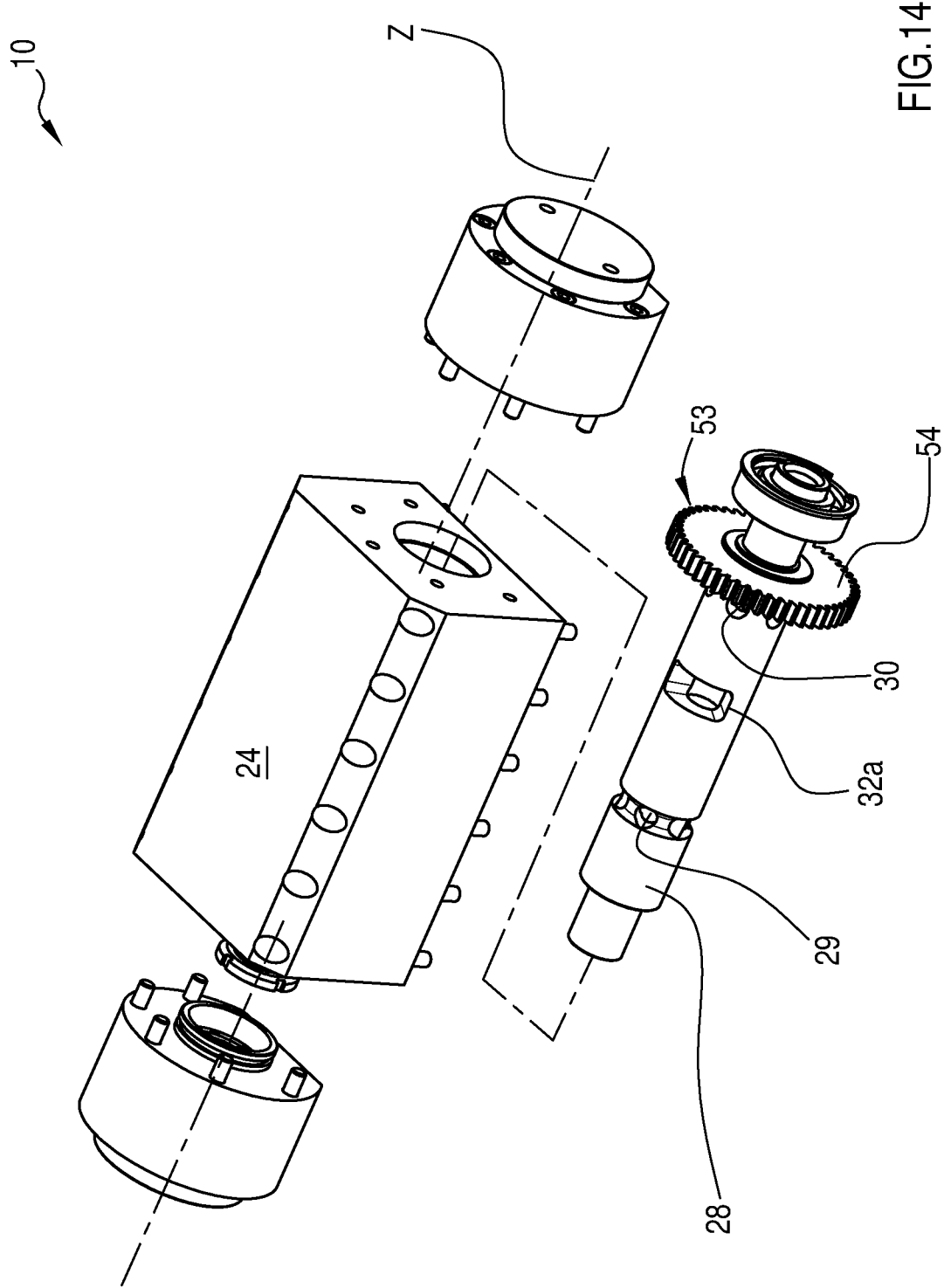
FIG. 14 shows an exploded view of a valve of a volumetric expander according to the present invention.

In the discharge condition, on the other hand, the lateral opening 31a is facing the side opposite the expansion chamber 7 (FIG. 12), arranging itself opposite the first passage 26, in particular inlet 8. In this same position of body 28, the lateral opening 32a is facing the expansion chamber 7 in fluid communication with the second passage 27, in particular outlet 9.

Therefore, during the rotation of the distributing body 28, the expansion chamber 7 is put in communication with the outside alternately by means of the first and second channel 31 and 32, in particular of the respective openings 31a and 32a.

Whereby, the working flow at the gaseous state coming from evaporator 3 can enter the expansion chamber 7, crossing in succession the housing seat 25, the introduction channel 29, the first channel 31, the first passage 26 and inlet 8 to reach the expansion chamber 7 (FIG. 11).

As regards the outlet path of the working fluid from within chamber 7 outwards, a similar solution can of course be implemented. From within chamber 7, the same working flow can exit by crossing in succession outlet 9, the second passage 27, the second channel 32, the emission channel 30 to reach the second conduit 61 and finally the discharge chamber.

The general inlet 51 of casing 50 is in direct fluid communication only with the introduction channel 29 of valve 10: the general inlet 51 does not directly communicate with the discharge chamber or with the general outlet 52 of the casing. The general outlet 52 directly communicates with the discharge chamber of body 52 which is in direct fluid communication with the emission channel 30 of valve 10.

As described above, expander 4 further comprises at least one transmission member 53 arranged into casing 50, within the discharge chamber of the working fluid, connected—on one side—to valve 10 and—on the other side—to the main shaft 11: the transmission member 53 is configured for synchronizing the working fluid introduction condition, expansion condition and discharge condition with the rotation of the main shaft 11.

In particular, the transmission member 53 is housed at least partially inside the cavity of casing 50 and partially within the valve body 24. In greater detail, the transmission member 53 is constrained, on one side, to the distributing body 28 of each valve and, on the other side, to the main shaft 11. As visible for example in FIG. 10, at least part of member 53 is housed inside the second conduit 61 and receives the working fluid exiting the expansion chamber (exiting from each expansion chamber).

In even greater detail, the transmission member 53 for each valve 10 of expander 4 comprises at least a first toothed wheel 54 keyed on the distributing body 28 of valve 10. The transmission member 53 comprises at least a second toothed wheel 55 keyed on the main shaft 11 connected to the first toothed wheel 54 (in particular to each toothed wheel 54).

The accompanying figures show a preferred embodiment of the invention in which the transmission member comprises—for each first toothed wheel 54—at least one intermediate member 56—such as a toothed wheel 56—configured for connecting the first and the second toothed wheel 54, 55 in the movement.

In particular, each first toothed wheel 54 is housed at least partially into a respective valve body 24 and at least partially into a respective second conduit 61 of casing 50. The second toothed wheel is instead housed into the discharge chamber while each toothed wheel 56 is at least partially housed into the discharge chamber and at least partially into its the respective second conduit 61. The transmission member 53, at each complete rotation of the main shaft 11, makes the suction opening 31a rotate for a short period, comprised into the same complete revolution, in front of opening 8 so at to put in chamber 7 permanent communication with evaporator 3.

In a subsequent interval in the same rotation, the distributing body 28 closes access to inlet 8 and puts chamber 7 in communication with outlet 9.

In practice, the transmission member 53 is configured for selectively putting each expansion chamber 7 of the expander in communication with the first and second passage 26 and 27 for the introduction and discharge of the working fluid according to a sequence synchronized with the movement and position of each piston 6: this opening/closing sequence of inlet 8, and of opening/closing of outlet 9 are controlled by and comprised in the same and single rotation by the main shaft 11.

In practice, the transmission member is configured for synchronizing at least the working fluid introduction and discharge conditions of the different expansion chambers 7 so that the introduction condition or discharge condition, respectively, of an expansion chamber 7 is temporarily offset with respect to an introduction condition or discharge condition, respectively, of another expansion chamber 7.

Therefore, the introduction of a working flow at the gaseous state with adequate pressure and with the methods explained above into the expansion chamber 7, a predetermined reciprocating motion of piston 6 into shell 5 is obtained; this movement transforms such a movement into a rotary movement of shaft 11, which can be used to drive an electric generator 12, as shown in the accompanying figures, General consisting of a rotor, keyed on the main shaft 11 (FIG. 4), and a stator, known per se.

The electric generator 12 therefore generates one or more electric voltages adapted to supply, through appropriate electrical connections, not shown, the user devices that can take a variety of shapes, uses and nature.

As mentioned above, plant 100 may comprise a control unit 33; advantageously, such a unit 33 is connected to the distributing body 28 and/or the main shaft 11 and is configured for monitoring the position and movement of the latter.

Process for the Production of Electric Energy

A further object of the present invention is a process of converting thermal energy into electric energy. The process comprises a circulation step of the working fluid whose motion is imparted by pump 13. The working fluid, pushed by pump 13, reaches evaporator 3 which, due to the hot source H heats the working fluid up to the evaporation thereof (a condition visible in the schematics in FIG. 1).

The pressure jump imposed by pump 13 is substantially the jump required by the cycle as a function of the working conditions. In other words, pump 13 is fed by the fluid at the liquid state at the condensation pressure unless undercooled. The outlet pressure depends on the evaporation pressure that is equal to the evaporation pressure of the working fluid, or to the hot source temperature unless overheated. The working fluid mass flow rate is dependent on the available thermal power and on the imposed overheating.

The process may comprise additional fluid heating steps prior to the evaporation steps. In particular, the process may comprise a heat recovery step by means of economizer 36: this step allows heating the working fluid from the pump by means of the working fluid from the expander.

The process may further comprise a pre-heating step of the working fluid leaving from economizer 36 by means of the third heat exchanger 18. The pre-heating step allows heating the working fluid without causing the evaporation of the latter. The heat for pre-heating is taken from the hot source H exiting evaporator 3. In order to correctly optimize the process, evaporator 3 and pre-heater 18 may be sized so that they can respectively operate in heat exchange between fluid/gas and fluid/fluid.

After the evaporation process, the working fluid at the gaseous state reaches the volumetric expander 4: the working fluid crosses in succession the housing seat 25 of valve 10, the inlet channel 29, the first channel 31, opening 31*a*, the first passage 26, inlet 8 up to enter the expansion chamber 7: these steps determine the condition of introduction of the working fluid.

After the introduction step, the expander determines the expansion step (inlet 8 and outlet 9 are closed and consequent expansion of the fluid) due to its higher pressure. As a result of this expansion, piston 6 is urged to move in reciprocating motion (reciprocating expander) or rotary motion (rotary expander), in a per se known manner, thus putting in rotation the main shaft 11 and it finally actuates said electric generator 12.

The gas flow is then ejected from the expansion chamber 7 through outlet 9, the second passage 27, opening 32*a*, the emission channel 30 up to exit body 24 of valve 10 and then the general outlet 52 of casing 50.

From here, circuit 2 itself conveys the working fluid into condenser 16 in which such a fluid is condensed and sent to the collecting reservoir 17.

Reservoir 17 is in fluid communication with pump 13 which directly draws from said reservoir to circulate the working fluid back in the circuit. In greater detail, the collecting reservoir 17 is interposed between condenser 16 and pump 13 and allows the accumulation of working fluid at the liquid state: in this condition, reservoir 17 ensures the draft of liquid to pump, preventing the draft of any air bubbles, thereby ensuring a continuous supply of liquid.

Process of Starting the Volumetric Expander.

An object of the present invention is also a process of starting a volumetric expander 4 according to one or more of the appended claims and/or according to the above description.

The process comprises a step of introducing working fluid at the gaseous state in the discharge chamber of casing 50 through the further inlet 59. The working fluid introduced through the auxiliary inlet 59 has a temperature of less than 150° C., in particular, of between 25° C. and 100° C.; the working fluid at the gaseous state is introduced under pressure in the discharge chamber through the further inlet 59 at a pressure comprised between 4 bar and 30 bar, particularly between 4 bar and 25 bar, even more particularly between 7 bar and 25 bar. During this introduction step, the working fluid enters the discharge chamber and exits from the general outlet 52. During this introduction step, the working fluid does not reach the general inlet 51: during this introduction step, there is no introduction of additional working fluid through the general inlet 51.

The passage of hot fluid enables to heat at least partially the transmission member 53, piston 6, casing 50, valve 10 and the crank mechanism 37.

The introduction step allows heating, by the working fluid at the gaseous state introduced through the further inlet 59, any working fluid at the liquid state present in the expander in order to enable, for at least part of said working fluid at the liquid state, to switch from the liquid to the gaseous state.

At the end of the introduction step, the process involves a step of introducing the working fluid at the gaseous state only through the general inlet 51 for determining a starting condition of the volumetric expander 4.

Advantages of the Invention

The present invention allows obtaining significant advantages over the prior art solutions. The volumetric expander 4 as described above comprises at least a piston 6, a valve 10, transmission members 53 and a crank mechanism 37 all arranged into casing 50: expander 4 has a simple and compact structure that facilitates the installation thereof on plant 100. Due to casing 50 housing a portion of driving shaft 11, pistons 6, the transmission members 53, valves 10 and the crank mechanism 37—it is possible (having to perform any intervention) to disassemble the entire group (expander 4) and install a new one with few operations. It should also be noted that the presence of the transmission members 53 inside casing 50—and in particular at least partially into the discharge chamber—allows the automatic lubrication of such members 53 during the operation of expander 4 (that is, during the operating condition in which the main shaft 11 is moved in rotation). in fact, the working fluid exiting valve 10 impinges the transmission members 53 and enters the discharge chamber. In this way, expander 4 does not require additional lubrication systems for the moving parts. It should also be noted that also the crank mechanism 37 works inside the discharge chamber and is impinged by the working fluid from the expander. The structure of expander 4 object of the present invention thus ensures the automatic and efficient lubrication of all components inside casing 50.

The invention therefore allows easy assembly and disassembly of the entire expander 4 as a single piece and an optimal lubrication of all moving parts is achieved.

It should also be noted that the presence of further inlet 59 allows quickly bringing how pressurized working fluid inside casing 50 also in conditions of stationary expander, i.e. with rotation of the main shaft 11 excluded and without letting the working fluid enter the expansion chamber 7.

The further inlet 59 allows the working fluid at the gaseous state to be directly introduced into the discharge chamber: the fluid purges and at the same time heats all the internal components of the expander so as to allow the passage to the gaseous state of any liquid condensates into expander 4 which may be formed in stationary expander conditions.

Since the incoming working fluid is hot, under pressure and at the gaseous state, there is an efficient energy transfer much greater than an extemporaneous heating from the outside: at the same time, the mechanical purge effect of any liquid phases by the incoming fluid is maintained. It should also be noted that the auxiliary inlet 59 allows using the available thermal energy of the working fluid without electric energy consumption; in fact, due to the presence of inlet 59, consumption of electric energy for heating the expander can be avoided and thus the yields of the entire plant 100 can be kept high (there is no electric energy consumption that would be subtracted from the electric energy produced by plant 100).

The invention allows carrying out facilitated restarting operations of expander 4 after any downtime conditions since all moving parts are in a single, almost airtight casing 50 that can be effectively heated by introducing hot fluid therein.

The invention claimed is:

1. A volumetric expander for a closed cycle plant said volumetric expander comprising:
    at least one casing exhibiting at least one general inlet enabling introduction of a working fluid inside the at least one casing and at least one general outlet enabling expulsion of the working fluid from said at least one casing,
    a piston inside the at least one casing defining a variable volume expansion chamber,
    a main shaft connected to the piston and configured for rotatively moving around a main axis, said main shaft being housed at least partially inside the at least one casing,
    at least one valve configured for selectively opening and closing an inlet and outlet of the expansion chamber enabling at least:
        an introduction condition in which the working fluid is introduced into the expansion chamber,
        an expansion condition in which the working fluid expands in the expansion chamber, and
        a discharge condition in which the working fluid is discharged from said expansion chamber,
    a transmission member connected—on one side—to the at least one valve and—on the other side—to the main shaft, said transmission member being configured for synchronizing the working fluid introduction condition, expansion condition and discharge condition with the rotation of the main shaft,
    wherein the at least one casing internally defines a discharge chamber in direct fluid communication with the at least one general outlet, the discharge chamber being further configured for being put in direct fluid communication with the outlet of the expansion chamber during the discharge condition,
    wherein the transmission member is located in the at least one casing inside the discharge chamber,
    wherein the at least one casing comprises a lateral wall extending between first and second longitudinal end portions, said lateral wall extending in thickness between an outer surface and inner surface of the at least one casing, said inner surface delimiting an inner cavity of the at least one casing defining at least part of the discharge chamber, wherein the transmission member is located at least partially inside the inner cavity of the at least one casing between the first and second longitudinal end portions,
    and wherein the at least one casing comprises:
        at the first longitudinal end portion, a front closure element,
        at the second longitudinal end portion, a back closure element,
    wherein the inner surface of the lateral wall of the at least one casing, together with said front and back closure elements, delimiting the inner cavity of the at least one casing itself,
    and wherein the at least one general inlet and the at least one general outlet are both defined on the front closure element or on the back closure element.

2. The volumetric expander according to claim 1 comprising at least one crank mechanism constrained, on one side, to the piston and, on the other side, to the main shaft, said at least one crank mechanism being configured for turning the main shaft around said main axis as a consequence of an alternative sliding motion of the piston,
    wherein at least part of the main shaft and the whole at least one crank mechanism are placed inside the discharge chamber of the at least one casing,
    wherein the main shaft comprises an engagement portion spaced from the rotation axis of the main shaft,
    and wherein the at least one crank mechanism comprises:
        a base element constrained, optionally hinged, to the engagement portion of the main shaft, said base element being rotatively movable around the main axis of the main shaft,
        a thrusting element directly connected—on one side—to the base element and—on the other side—to the piston.

3. The volumetric expander according to claim 1, wherein the at least one valve comprises:
    an internally hollow valve body exhibiting:
        a housing seat, having, optionally, a substantially cylindrical shape developing inside the valve body,
        at least one first and one second passages respectively configured for being put in fluid communication with the inlet and with the outlet of the expansion chamber,
    at least one distribution body rotatively engaged inside the housing seat of the valve body, and comprising:
        at least one introduction channel in fluid communication with the at least one general inlet of the at least one casing,
        at least one emission channel in fluid communication with the discharge chamber of the at least one casing and with the at least one general outlet,
        at least one first channel in direct fluid communication with the introduction channel, the first channel comprising at least one lateral opening configured for being put in fluid communication with the first passage of the valve body,
        at least one second channel, distinct and separated from the first channel, in direct fluid communication with the emission channel, the second channel comprising at least one respective lateral opening—angularly offset from the lateral opening of the first channel with respect to a rotation axis of the distribution body—configured for being put in fluid communication with the second passage of the valve body,
    the distribution body, following rotation inside the housing seat around the rotation axis, determining selection between the introduction, expansion and discharge conditions of the volumetric expander.

4. The volumetric expander according to claim 3, wherein the transmission member is at least partially located inside the valve body and directly engaged with the distribution body of the at least one valve.

5. The volumetric expander according to claim 3, wherein the transmission member comprises:
   at least one first toothed wheel fitted to the distribution body of the at least one valve,
   at least one second toothed wheel fitted to the main shaft,
   at least one intermediate member configured for movably connecting the at least one first and the at least one second toothed wheels.

6. The volumetric expander according to claim 1 comprising:
   a plurality of pistons operating inside the at least one casing, each being received in a respective shell defined inside the at least one casing,
   wherein said pistons are angularly offset from each other with respect to the main axis of the main shaft
   wherein the at least one valve comprises a valve for each expansion chamber of each piston,
   a crank mechanism for each piston,
   wherein the transmission member—for each piston—comprises:
      at least one first toothed wheel fitted to the distributing body of the valve for each expansion chamber,
      at least one second toothed wheel fitted to the main shaft,
      at least one intermediate member configured for connecting the first and second toothed wheels,
   said transmission member being configured for:
      synchronizing—for each piston—at least the working fluid introduction and discharge conditions with respect to the expansion chamber with the rotation of the main shaft,
      synchronizing at least the working fluid introduction and discharge conditions of the different expansion chambers so that the introduction condition or discharge condition, respectively, of an expansion chamber is temporarily offset with respect to an introduction condition or discharge condition, respectively, of another expansion chamber.

7. The volumetric expander according to claim 3, wherein:
   the at least one general inlet is in direct fluid communication only with the introduction channel of the at least one valve, the at least one general inlet does not directly communicate with the discharge chamber nor with the at least one general outlet, and
   wherein the at least one general outlet directly communicates with the discharge chamber which is in direct fluid communication with the emission channel of the at least one valve.

8. A volumetric expander for a closed cycle plant, said volumetric expander comprising:
   at least one casing exhibiting at least one general inlet enabling introduction of a working fluid inside the at least one casing and at least one general outlet enabling expulsion of the working fluid from said at least one casing,
   a piston inside the at least one casing defining a variable volume expansion chamber,
   a main shaft connected to the piston and configured for rotatively moving around a main axis, said main shaft being housed at least partially inside the at least one casing,
   at least one valve configured for selectively opening and closing an inlet and outlet of the expansion chamber enabling at least:
      an introduction condition in which the working fluid is introduced into the expansion chamber,
      an expansion condition in which the working fluid expands in the expansion chamber, and
      a discharge condition in which the working fluid is discharged from said expansion chamber,
   a transmission member connected—on one side—to the at least one valve and—on the other side—to the main shaft, said transmission member being configured for synchronizing the working fluid introduction condition, expansion condition and discharge condition with the rotation of the main shaft,
   wherein the at least one casing internally defines a discharge chamber in direct fluid communication with the at least one general outlet, the discharge chamber being further configured for being put in direct fluid communication with the outlet of the expansion chamber during the discharge condition,
   wherein the transmission member is located in the at least one casing inside the discharge chamber,
   and wherein the at least one casing comprises at least one auxiliary inlet which is only directly in communication with the discharge chamber and, through the discharge chamber, with the at least one general outlet, said at least one auxiliary inlet being not in direct fluid communication with the at least one general inlet and being configured for enabling the working fluid to directly enter the discharge chamber.

9. The volumetric expander according to claim 8, wherein the at least one casing comprises a lateral wall extending between first and second longitudinal end portions, said lateral wall extending in thickness between an outer surface and inner surface of the at least one casing, said inner surface delimiting an inner cavity of the at least one casing defining at least part of the discharge chamber, wherein the transmission member is located at least partially inside the inner cavity of the at least one casing between the first and second longitudinal end portions.

10. The volumetric expander according to claim 9, wherein the at least one casing comprises:
   at the first longitudinal end portion, a front closure element,
   at the second longitudinal end portion, a back closure element,
   the inner surface of the lateral wall of the at least one casing, together with said front and back closure elements, delimiting the inner cavity of the at least one casing itself; and wherein the at least one general inlet and the at least one general outlet are both defined on the front closure element or on the back closure element.

11. The volumetric expander according to claim 8, wherein the at least one general inlet, the at least one general outlet and the auxiliary inlet are all defined on the front element.

12. The volumetric expander according to claim 8 comprising a crank mechanism constrained, on one side, to the piston and, on the other side, to the main shaft, said crank mechanism being configured for turning the main shaft around said main axis as a consequence of an alternative sliding motion of the piston,
   wherein at least part of the main shaft and the whole crank mechanism are placed inside the discharge chamber of the at least one casing, wherein the main shaft comprises an engagement portion spaced from the rotation axis of the main shaft, and wherein the crank mechanism comprises:

a base element constrained, optionally hinged, to the engagement portion of the main shaft, said base element being rotatively movable around the main axis of the main shaft, a thrusting element directly connected—on one side—to the base element and—on the other side—to the piston.

13. The volumetric expander according to claim 8, wherein the at least one valve comprises:

an internally hollow valve body exhibiting:

a housing seat, having, optionally, a substantially cylindrical shape developing inside the valve body, at least one first passage and at least one second passage, wherein the at least one first passage and the at least one second passage are configured, respectively, for being put in fluid communication with the inlet and with the outlet of the expansion chamber, at least one distribution body rotatively engaged inside the housing seat of the valve body, and comprising:

at least one introduction channel in fluid communication with the at least one general inlet of the at least one casing, at least one emission channel in fluid communication with the discharge chamber of the at least one casing and with the at least one general outlet of the discharge chamber, at least one first channel in direct fluid communication with the introduction channel, the first channel comprising at least one lateral opening configured for being put in fluid communication with the at least one first passage of the valve body, at least one second channel, distinct and separate from the at least one first channel, in direct fluid communication with the at least one emission channel, the at least one second channel comprising at least one respective lateral opening—angularly offset from the lateral opening of the at least one first channel with respect to a rotation axis of the at least one distribution body—configured for being put in fluid communication with the at least one second passage of the valve body, the at least one distribution body, following rotation inside the housing seat around the rotation axis, determining selection between the introduction, expansion and discharge conditions of the volumetric expander;

wherein the transmission member is at least partially located inside the valve body and directly engaged with the at least one distribution body of the at least one valve.

14. A volumetric expander for a closed cycle plant comprising:

at least one casing exhibiting at least one general inlet enabling introduction of a working fluid inside the at least one casing and at least one general outlet enabling expulsion of the working fluid from said at least one casing, a piston housed in said at least one casing defining a variable volume expansion chamber, a main shaft connected to the piston and configured for turning around a main axis, at least one valve associated with the at least one casing and configured for selectively opening and closing an inlet and outlet of said expansion chamber enabling at least:

an introduction condition in which the working fluid is introduced into the expansion chamber, an expansion condition in which the working fluid expands in the expansion chamber, and a discharge condition in which the working fluid is discharged from said expansion chamber, wherein the at least one casing internally defines a discharge chamber in direct fluid communication with the at least one general outlet, the discharge chamber being further configured for being put in direct fluid communication with the outlet of the expansion chamber during said discharge condition, wherein the at least one casing comprises at least one auxiliary inlet which is in direct communication only with the discharge chamber of the at least one casing and, through the discharge chamber, with the at least one general outlet, the auxiliary inlet being configured for enabling the working fluid to directly enter the at least one casing.

15. The volumetric expander according to claim 14, wherein the auxiliary inlet is not in direct fluid communication with the at least one general inlet, said auxiliary inlet being configured to directly introduce and then circulate the working fluid in a gaseous state in the discharge chamber.

16. The volumetric expander according to claim 14, wherein the at least one casing comprises:

a lateral wall extending between a first and second longitudinal end portions, said lateral wall extending in thickness between an outer surface and inner surface, said inner surface delimiting an inner cavity of the at least one casing defining at least part of the discharge chamber, at the first longitudinal end portion, a front closure element, at the second longitudinal end portion, a back closure element, wherein the at least one general inlet of the at least one casing is defined on the front closure element or on the back closure element, and wherein the at least one general outlet of the at least one casing is defined on the front closure element or on the back closure element, wherein the auxiliary inlet is defined on the front closure element or on the back closure element, and optionally wherein the inner surface of the lateral wall of the at least one casing, with said front and back closure elements, delimit the inner cavity of the at least one casing.

17. The volumetric expander according to claim 16, with one of the following:

the at least one general inlet and auxiliary inlet are both on the front closure element, the at least one general inlet and the auxiliary inlet are both on the back closure element of the at least one casing, the at least one general inlet, the auxiliary inlet and the at least one general outlet of the at least one casing are all on the front closure element, the at least one general inlet, the auxiliary inlet and the at least one general outlet are all on the back closure element of the at least one casing.

18. The volumetric expander according to claim 16, wherein the at least one casing comprises a hollow tubular body exhibiting a through opening extending between the first and second longitudinal end portions and at least partially delimited by the inner surface,
  wherein at the first and second longitudinal end portions, the at least one casing exhibits respectively a first access and a second access, the front closure element being engaged at the first access in a fluid-tight manner.

19. The volumetric expander according to claim 16, wherein the at least one casing comprises a first through connecting conduit and a second through connecting conduit, the first and second through connecting conduits extending between the outer surface and the inner surface of the at least one casing,
  the at least one valve being engaged at the outer surface of the at least one casing and being in fluid communication with the first and second through connecting conduits,
  wherein the first connecting conduit is in direct fluid communication with the at least one general inlet, but does not directly communicate with the discharge chamber and with the at least one general outlet,
  wherein the second through connecting conduit is in direct fluid communication with the discharge chamber,
  and optionally wherein the first and second through connecting conduits are not in direct fluid communication with each other.

20. The volumetric expander according to claim 18, wherein the front closure element comprises:
  an abutment portion abutting on a front wall of the at least one casing, said abutment portion being configured for completely covering the first access of the at least one casing,
  an engagement portion emerging from the abutment portion inside the cavity of the at least one casing and delimited by an outer surface countershaped to the inner surface of the at least one casing,
  wherein the at least one general inlet—defined on the front closure element—comprises:
    an attachment portion defining a blind cavity crossing in thickness the abutment portion and at least part of the engagement portion of the front closure element,
    at least a distribution channel in fluid communication with the attachment portion and emerging transversally from the attachment portion to the outer surface of the engagement portion.

21. The volumetric expander according to claim 14, wherein the at least one valve comprises:
  an internally hollow valve body exhibiting:
    a housing seat, having a substantially cylindrical shape developing inside the valve body,
    at least one first and at least one second passage respectively configured for being put in fluid communication with the inlet and outlet of the expansion chamber,
  at least one distribution body rotatively engaged inside the housing seat of the valve body, and comprising:
    at least one introduction channel in fluid communication with the at least one general inlet of the at least one casing,
    at least one emission channel in fluid communication with the discharge chamber of the at least one casing and with the at least one general outlet of the at least one casing,
    at least one first channel in directly fluid communication with the introduction channel, the first channel comprising at least one lateral opening configured for being put in fluid communication with the first passage of the valve body,
    at least one second channel, distinct and separated from the first channel, the second channel being in direct fluid communication with the emission channel, the second channel comprising at least one respective lateral opening—angularly offset from the lateral opening of the first channel with respect to a rotation axis of the distributing body—configured for being put in fluid communication with the second passage of the valve body,
  the distribution body, following a rotation inside the housing seat around the rotation axis, being configured for selecting between the introduction, expansion and discharge conditions of the volumetric expander,
  wherein the at least one general inlet of the at least one casing is in direct fluid communication only with the introduction channel of the at least one valve, wherein the at least one general inlet does not directly communicate with the discharge chamber or with the at least one general outlet of the at least one casing, and
  wherein the at least one general outlet directly communicates with the discharge chamber of the at least one casing which is in direct fluid communication with the emission channel of the at least one valve.

22. The volumetric expander according to claim 21, wherein:
  the variable volume of the expansion chamber is delimited by a respective shell operating inside the at least one casing, and by said piston slidingly received in said shell, said inlet and outlet being positioned on said shell which delimits a seat,
  the seat of the shell extends along all the thickness of the lateral wall of the at least one casing defining a cavity passing through the thickness of said lateral wall,
  the at least one valve is placed at the shell so that the lateral openings—respectively of the first and second channels of the valve body—abut and are in direct fluid communication with the through cavity defined by the seat of the shell.

23. The volumetric expander according to claim 22, wherein the at least one casing comprises a first through connecting conduit and a second through connecting conduit, the first and second through connecting conduits extending between the outer surface and the inner surface of the at least one casing,
  the at least one valve being engaged at the outer surface of the at least one casing and being in fluid communication with the first and second through connecting conduits,
  wherein the first connecting conduit is in direct fluid communication with the at least one general inlet, but does not directly communicate with the discharge chamber and with the at least one general outlet,
  wherein the second through connecting conduit is in direct fluid communication with the discharge chamber, and, optionally, wherein the first and second through connecting conduits are not in direct fluid communication with each other,
  wherein the introduction channel of the at least one valve is in direct fluid communication with the first through connecting conduit of the at least one casing,
  the emission channel of the at least one valve being in direct fluid communication with the second through connecting conduit of the at least one casing.

24. The volumetric expander according to claim 14 comprising a crank mechanism constrained, on one side, to the piston and, on the other side, constrained to the main shaft, said crank mechanism being configured for putting in rotation the main shaft around the axis when the piston slides, wherein at least part of the main shaft and the whole crank mechanism are placed in the discharge chamber of the at least one casing.

* * * * *